United States Patent
Kawamura et al.

(10) Patent No.: US 11,995,202 B2
(45) Date of Patent: May 28, 2024

(54) COMPUTER SYSTEM AND DATA ACCESS CONTROL METHOD

(71) Applicant: HITACHI, LTD., Tokyo (JP)

(72) Inventors: Shunji Kawamura, Tokyo (JP); Masaaki Tanizaki, Tokyo (JP); Tetsuhiro Hatogai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 353 days.

(21) Appl. No.: 17/433,250

(22) PCT Filed: Aug. 22, 2019

(86) PCT No.: PCT/JP2019/032757
§ 371 (c)(1),
(2) Date: Aug. 24, 2021

(87) PCT Pub. No.: WO2020/183758
PCT Pub. Date: Sep. 17, 2020

(65) Prior Publication Data
US 2022/0138339 A1    May 5, 2022

(30) Foreign Application Priority Data
Mar. 8, 2019  (JP) .................................. 2019-042450

(51) Int. Cl.
G06F 21/00    (2013.01)
G06F 21/62    (2013.01)

(52) U.S. Cl.
CPC ................................ *G06F 21/6218* (2013.01)

(58) Field of Classification Search
CPC . G06F 21/6218; G06F 16/2457; H04L 67/63; H04W 12/06
See application file for complete search history.

(56) References Cited

U.S. PATENT DOCUMENTS

| 10,817,617 | B1 * | 10/2020 | Zuo | .......................... | H04L 63/14 |
| 2018/0288095 | A1 * | 10/2018 | Shaw | ....................... | H04L 67/12 |
| 2019/0095545 | A1 * | 3/2019 | Yamato | ..................... | H04Q 9/00 |

FOREIGN PATENT DOCUMENTS

| EP | 3432145 A1 | 1/2019 |
| JP | 2017-167747 A | 9/2017 |

OTHER PUBLICATIONS

Perera et al., "control data access based on characteristics of user and provider by determining quality and acquiring", IEEE Communications Surveys & Tutorials, vol. 16, No. 1, First Quarter (Year: 2014).*

(Continued)

*Primary Examiner* — Morshed Mehedi
(74) *Attorney, Agent, or Firm* — Volpe Koenig

(57) ABSTRACT

A computer system including a plurality of systems, in which the plurality of systems include a plurality of provision systems that provide data and a platform system that controls access to the data, the platform system receives, from a user, an acquisition request including a data acquisition condition, a quality condition, and a provider condition related to providers of data provided by the provision systems, and in a case where data satisfying the data acquisition condition satisfies the quality condition and a provider of the data satisfying the data acquisition condition satisfies the provider condition, the platform system performs control such that the user is allowed to access the data satisfying the data acquisition condition.

15 Claims, 19 Drawing Sheets

(56) References Cited

OTHER PUBLICATIONS

Extended European Search Report dated Nov. 9, 2022 for European Patent Application No. 19919054.7.

* cited by examiner

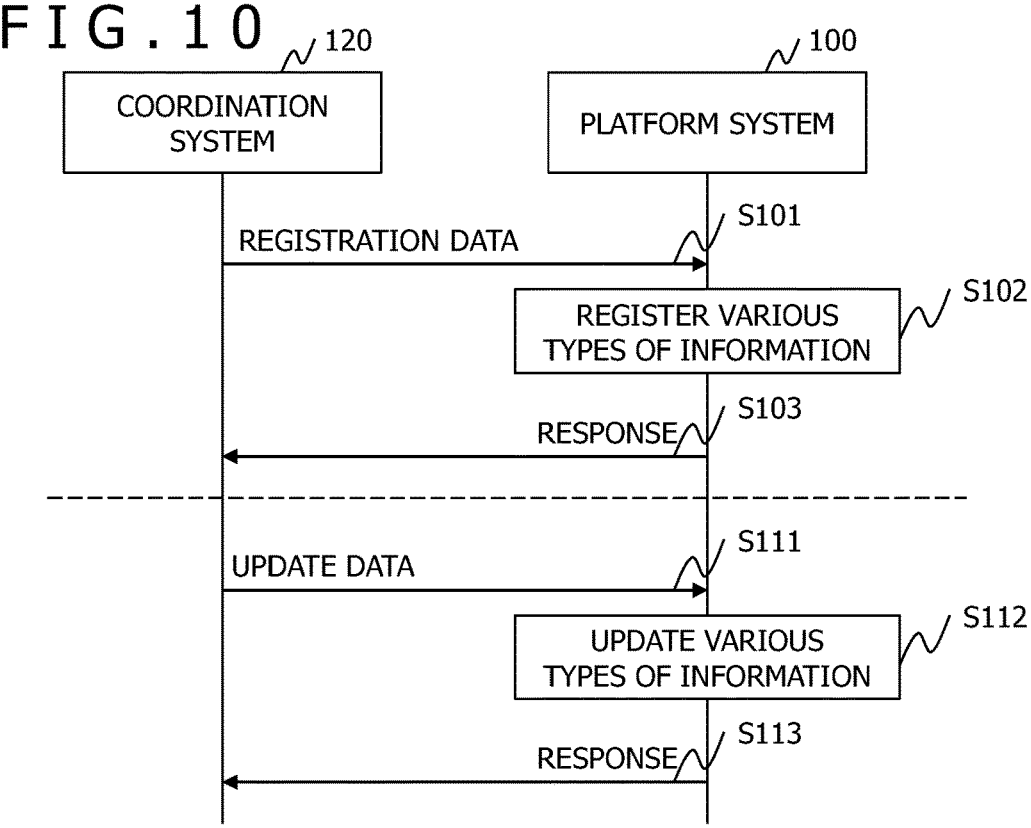
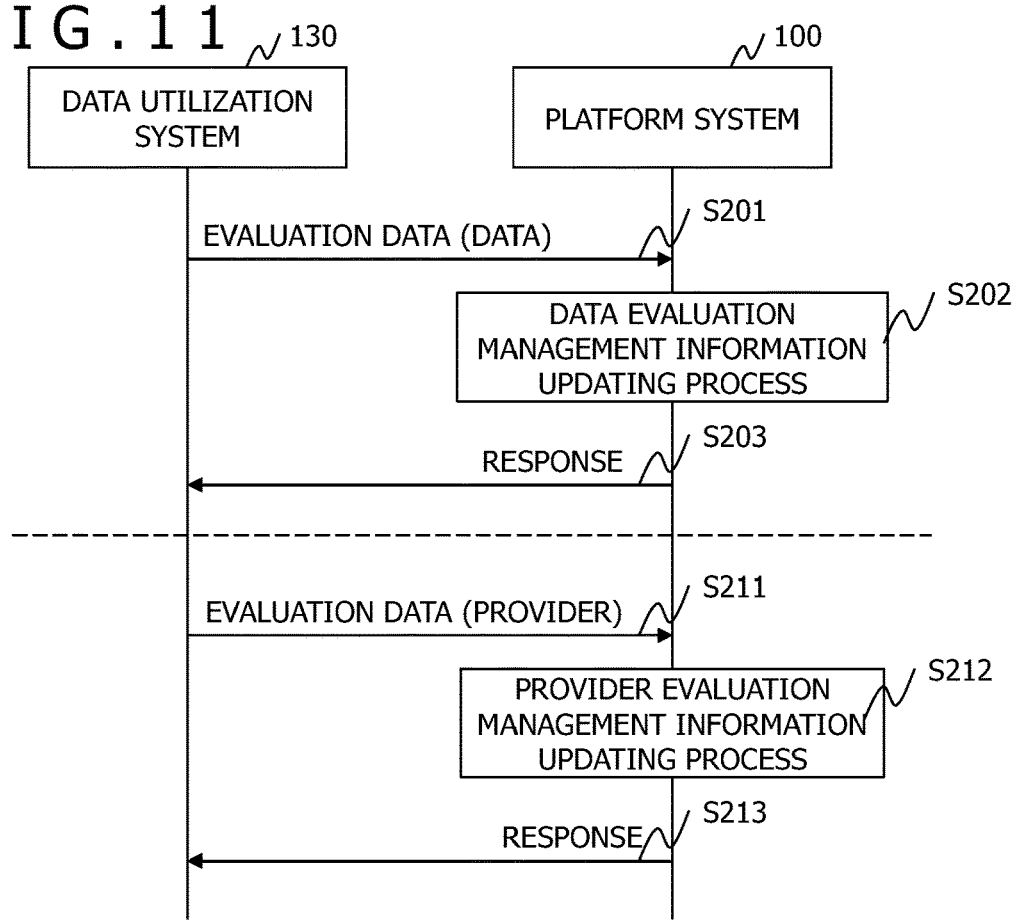

| MANAGEMENT IDENTIFIER (1901) | SYSTEM IDENTIFIER (1902) | EXTERNAL IDENTIFIER (1903) |
|---|---|---|
| D00001 | S1 | Dxx001 |
| ⋮ | ⋮ | ⋮ |

(351)

| EVALUATION ITEM (2001) | PRE-CONVERSION EVALUATION VALUE (2002) | CONVERSION METHOD (2003) |
|---|---|---|
| FORMAT NORMALITY | FORMAT CODE | CODE → TYPE CONVERSION |
| WRITING FORMAT CONSISTENCY | 0/1 | 0 → YES, 1 → NO |
| COMPLETENESS | RATE OF SHORTAGE | TOTAL NUMBER OF ELEMENTS × RATE OF SHORTAGE |

(352)

COMPUTER SYSTEM AND DATA ACCESS CONTROL METHOD

INCORPORATION BY REFERENCE

The present application claims the priority to Japanese Patent Application No. 2019-42450, filed on Mar. 8, 2019, the content of which is incorporated herein by reference.

TECHNICAL FIELD

The present invention relates to control of access to data managed by a plurality of systems.

BACKGROUND ART

Along with the development of the IoT, the sophistication of the network technology and the like, there have been proposed services that are realized by coordination between various fields, business categories and enterprises. For example, there is a known technology described in Patent Document 1.

Patent Document 1 describes "device-side metadata acquisition means for multiple devices; application-side metadata acquisition means that acquires application-side metadata for an application that uses data provided by a device; storage means 11 that stores both types of metadata; matching means 12 that matches both types of metadata and extracts a combination; and data-flow control means 14 that, on the basis of the extracted combination, generates a data-flow control command specifying a device and an application, are included. Each type of metadata includes permission information which is information indicating whether or not to permit a combination with multiple pieces of other party metadata. On the basis of the permission information, the matching means decides whether to generate a combination with a single piece of other party metadata, or to generate a combination with multiple pieces of other party metadata."

PRIOR ART DOCUMENT

Patent Document

Patent Document 1: JP-2017-167747-A

SUMMARY OF THE INVENTION

Problem to be Solved by the Invention

Since the technology described in Patent Document 1 does not take into consideration data quality, credibility information of data providers and the like, safe and useful data access cannot be realized.

For example, data with quality that a user requests cannot be acquired, and application development, data analysis and the like cannot be performed in some cases. Data provided by an enterprise with malicious intent is acquired in some cases. A user acquires data for the purpose of unauthorized use in some cases.

An object of the present invention is to provide a system and a method that realize safe and useful data access between various fields, business categories and enterprises.

Means for Solving the Problem

One representative example of the invention disclosed in the present application is as follows. That is, a computer system including a plurality of systems, in which the plurality of systems include a plurality of provision systems that provide data, and a platform system that controls access to the data, the platform system receives, from a first user, an acquisition request including a data acquisition condition for specifying data to be acquired, a quality condition related to quality of data, and a provider condition related to providers of data provided by the plurality of provision systems, and when data satisfying the data acquisition condition satisfies the quality condition, and a provider of the data satisfying the data acquisition condition satisfies the provider condition, the platform system performs control such that the first user is allowed to access the data satisfying the data acquisition condition.

Advantages of the Invention

According to one mode of the present invention, safe and useful data access between a plurality of operation systems (fields, business categories, and enterprises) can be realized. Problems, configurations and advantages other than those described above will be made clear by the following explanation of embodiments.

BRIEF DESCRIPTION OF THE DRAWINGS

FIG. 10 is a sequence diagram depicting the flow of a registration process in the computer system in the first embodiment.

FIG. 11 is a sequence diagram depicting the flow of a process of registering evaluation data in the computer system in the first embodiment.

MODES FOR CARRYING OUT THE INVENTION

Figure 1:
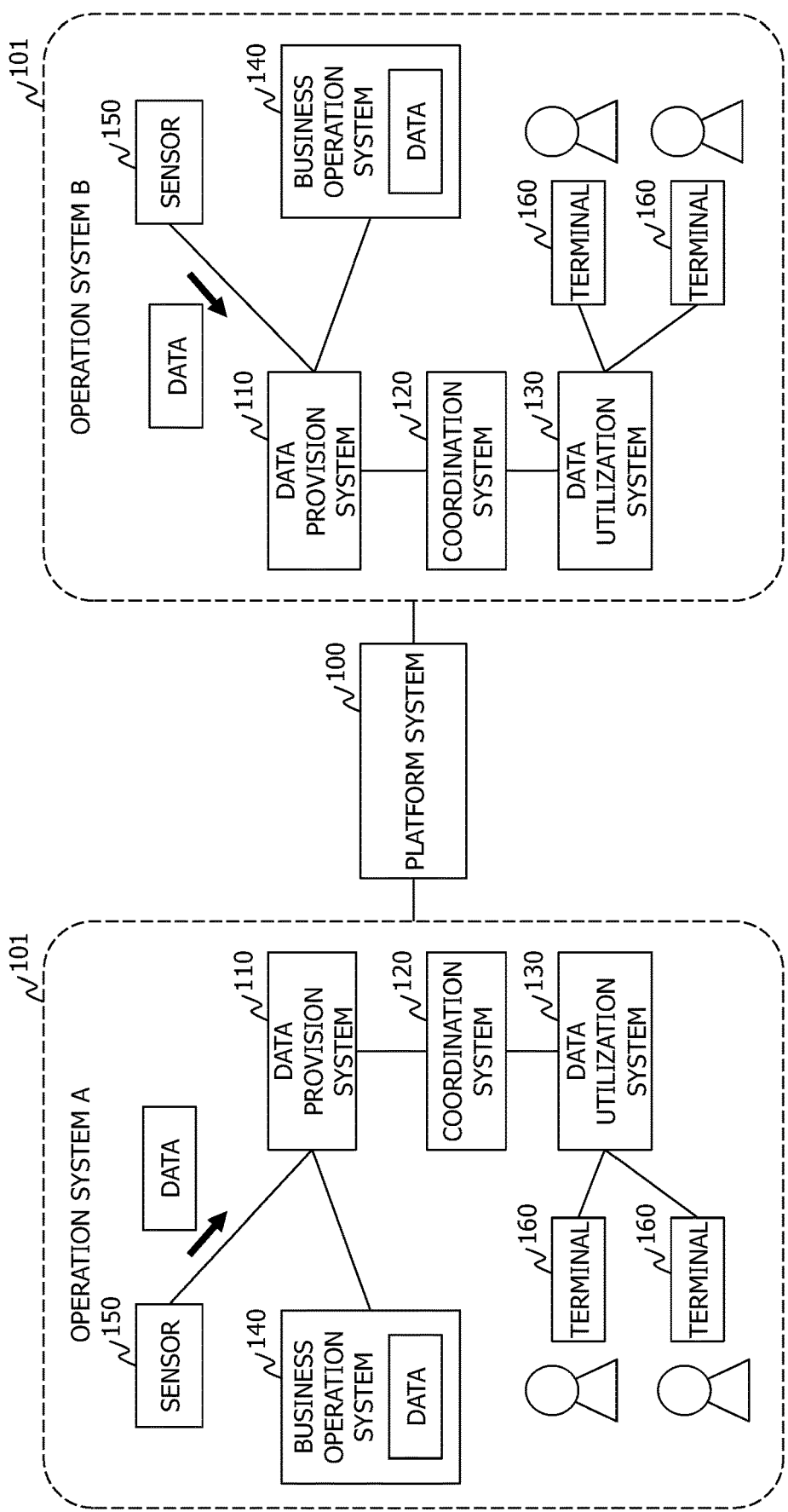
FIG. 1 is a figure depicting a configuration example of a computer system in a first embodiment.

Hereinafter, embodiments of the present invention are explained by using the figures. It should be noted however that the present invention should not be interpreted as being limited to the description content of the embodiments depicted below. Those skilled in the art would easily understand that specific configurations of the present invention can be modified within the scope not deviating from the idea or gist of the present invention.

In the configuration of the invention explained below, identical or similar configurations or functions are given identical reference characters, and overlapping explanations are omitted.

Expressions such as "first," "second" or "third" in the present specification and the like are given for identifying constituent elements, but do not necessarily limit numbers or orders.

First Embodiment

FIG. 1 is a figure depicting a configuration example of a computer system in a first embodiment.

The computer system includes a platform system 100 and a plurality of operation systems 101. The platform system 100 is connected with the plurality of operation systems 101 via networks such as a WAN (Wide Area Network) and the Internet.

The operation systems 101 are systems that are operated in particular enterprises, business categories or fields. An operation system 101 includes a data provision system 110, a coordination system 120, a data utilization system 130, a business operation system 140, a sensor 150 and terminals 160.

The data provision system 110 is a system that acquires data retained by the business operation system 140 and data generated by the sensor 150, and provides the data to users who use the terminals 160 or to the data utilization system 130. The data provision system 110 includes one or more computers. The business operation system 140 retains, as data, information on public facilities, disaster prevention maps, business operation logs, images, moving images and the like. The sensor 150 generates temperatures, sound volumes, images and the like as data.

Note that the numbers of business operation systems 140 and sensors 150 connected to the data provision system 110 may be two or more. Note that the present invention is not limited in terms of types and content of data retained by business operation systems 140 and data generated by sensors 150.

The data utilization system 130 is a system that receives requests from users via the terminals 160, and also acquires data. The data utilization system 130 is connected with a plurality of the terminals 160. The data utilization system 130 includes one or more computers.

The coordination system 120 is a system that performs the coordination between the data provision system 110 and the data utilization system 130. The coordination system 120 manages attributes of data, attributes of users, attributes of providers and the like, and also manages data access histories and the like. Here, the providers represent operators, managers or the like of the business operation system 140 and the sensor 150 that are the sources of data provided by the data provision system 110. The specific configuration of the coordination system 120 is explained by using FIG. 2.

The platform system 100 is a system that controls data access between the operation systems 101. The specific configuration of the platform system 100 is explained by using FIG. 3.

Note that the data provision system 110 and the coordination system 120 may be realized as one system. In addition, the data provision system 110 and the business operation system 140 may be realized as one system.

Note that a terminal manipulated by a manager of each system of the platform system 100, the data provision system 110, the coordination system 120 and the data utilization system 130 may be connected with the system.

Figure 2:
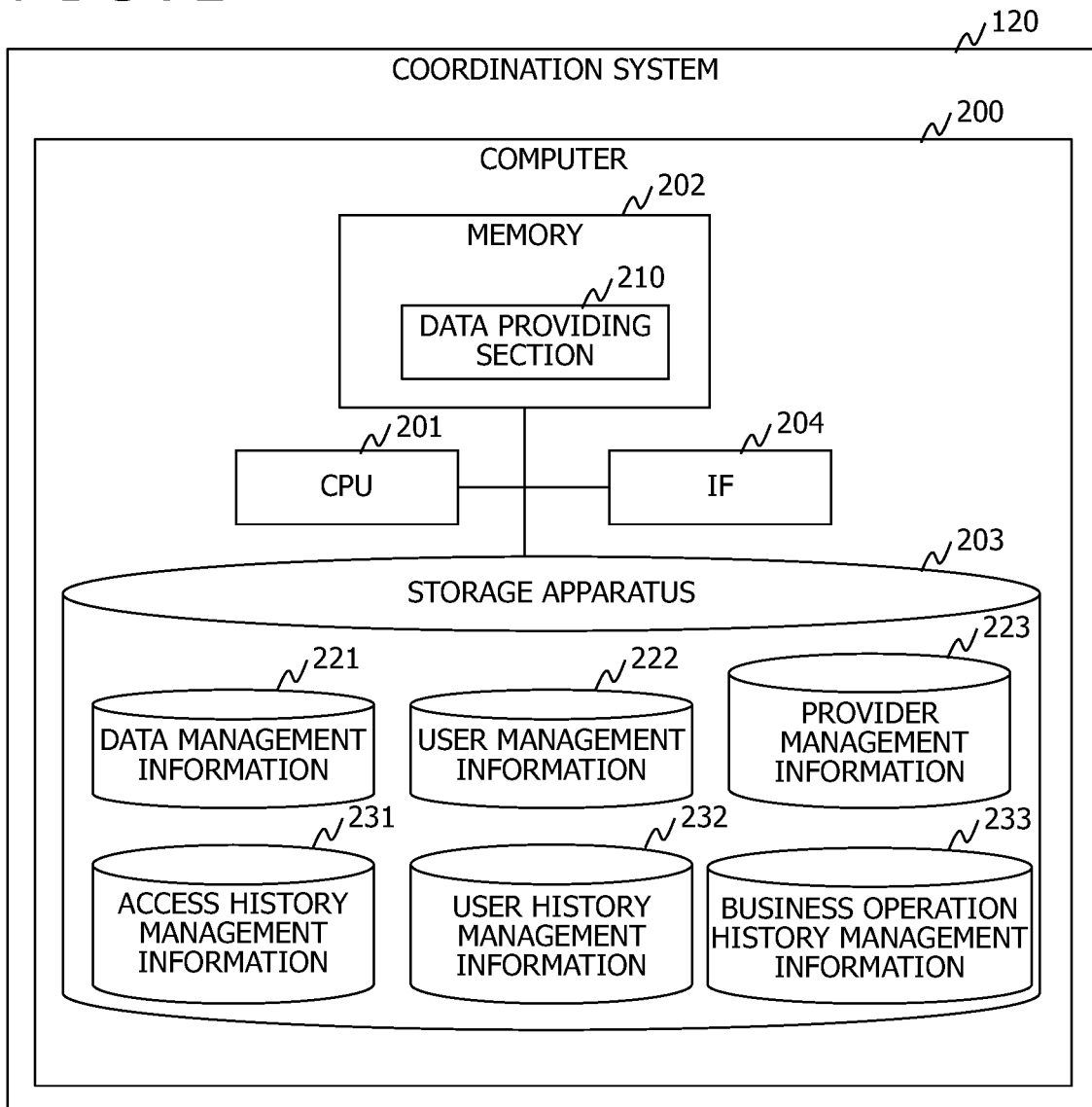
FIG. 2 is a figure depicting a configuration example of a coordination system in the first embodiment.

FIG. 2 is a figure depicting a configuration example of a coordination system 120 in the first embodiment.

The coordination system 120 includes one or more computers 200. Note that the coordination system 120 may include a storage system that stores various types of information, in addition to the computers 200.

A computer 200 has a CPU 201, a memory 202, a storage apparatus 203 and an interface 204.

The CPU 201 executes programs stored on the memory 202. By executing processes in accordance with the programs, the CPU 201 operates as functional sections that realize particular functions. In a case where processes are explained as being performed by a functional section in the following explanation, this represents that the CPU 201 executes a program for realizing the functional section.

The memory 202 stores programs to be executed by the CPU 201 and information used by the programs. In addition, the memory 202 includes a work area to be used by the programs temporarily. As depicted in FIG. 2, the memory 202 stores a program for realizing a data providing section 210. The data providing section 210 provides data to a user who manipulates a terminal 160. Note that the present invention is not limited in terms of functions and processes of the data providing section 210.

The interface 204 is an interface for connection to apparatuses, networks and the like. The interface 204 is a network interface, an I/O interface and the like.

The storage apparatus 203 is an apparatus such as an HDD (Hard Disk Drive), an SSD (Solid State Drive) or the like that stores data permanently. As depicted in FIG. 2, the storage apparatus 203 stores data management information 221, user management information 222, provider management information 223, access history management information 231, user history management information 232 and business operation history management information 233. Note that the storage apparatus 203 may store data acquired from the business operation system 140 and the sensor 150.

The data management information 221 is information for managing characteristics of data. Here, "characteristics of data" are a concept including attributes (catalog). The access history management information 231 is information for managing a history (access history) related to access to data. The data structures of the data management information 221 and the access history management information 231 are explained by using FIG. 4.

The user management information 222 is information for managing characteristics of a user who utilizes data. Here, "characteristics of a user" are a concept including attributes. The user history management information 232 is information for managing a history (user history) related to a user such as utilization of a data utilization system 130, payment or transaction. The data structures of the user management information 222 and the user history management information 232 are explained by using FIG. 5.

The provider management information 223 is information for managing characteristics of a provider. Here, "characteristics of a provider" are a concept including attributes. The business operation history management information 233 is information for managing a history (business operation history) related to business operation that the provider engages in, such as operation of the business operation system 140 and the sensor 150. The data structures of the provider management information 223 and the business operation history management information 233 are explained by using FIG. 6.

Note that in a case where a provider utilizes data of another operation system 101, the provider is registered as a user in the user management information 222. In addition, in a case where a user provides data, the user is registered as a provider in the provider management information 223.

Figure 3:
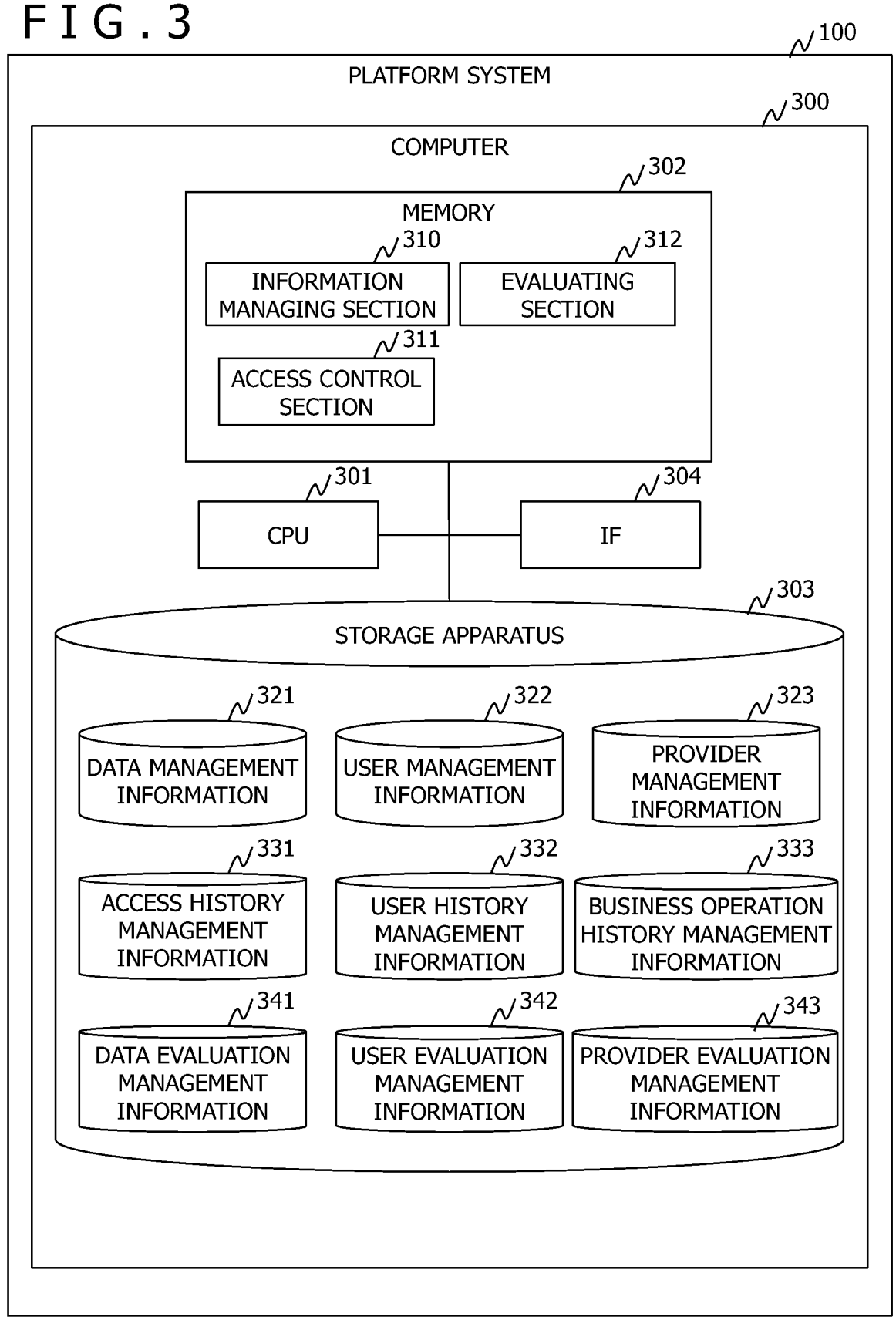
FIG. 3 is a figure depicting a configuration example of a platform system in the first embodiment.

FIG. 3 is a figure depicting a configuration example of the platform system 100 in the first embodiment.

The platform system 100 includes one or more computers 300. Note that the platform system 100 may include a storage system that stores various types of information, in addition to the computers 300.

A computer 300 has a CPU 301, a memory 302, a storage apparatus 303 and an interface 304. The CPU 301, the memory 302, the storage apparatus 303 and the interface 304 are hardware similar to the CPU 201, the memory 202, the storage apparatus 203 and the interface 204.

As depicted in FIG. 3, the memory 302 stores programs for realizing an information managing section 310, an access control section 311 and an evaluating section 312.

The information managing section 310 manages information about operation systems 101, information about data, users and providers, and various types of history. The access control section 311 controls data access between operation systems 101. The evaluating section 312 performs evaluation of data quality, users, and providers. Here, evaluation of users, and providers represents evaluation related to the credibility of the users and the providers.

Note that a plurality of functional sections in the functional sections provided in the computer 300 may be integrated into one functional section, or one functional section may be divided into a plurality of functional sections each of which corresponds to a function. In addition, the functional sections may be arranged dispersedly in a plurality of computers 300.

As depicted in FIG. 3, the storage apparatus 303 stores data management information 321, user management information 322, provider management information 323, access history management information 331, user history management information 332, business operation history management information 333, data evaluation management information 341, user evaluation management information 342 and provider evaluation management information 343.

The data management information 321 is information for managing characteristics of data. The access history management information 331 is information for managing access histories. The data evaluation management information 341 is information for managing evaluation of data quality. The data structures of the data management information 321, the access history management information 331 and the data evaluation management information 341 are explained by using FIG. 7.

The user management information 322 is information for managing characteristics of users who utilize data utilization systems 130. The user history management information 332 is information for managing user histories. The user evaluation management information 342 is information for managing evaluation of users. The data structures of the user management information 322, the user history management information 332 and the user evaluation management information 342 are explained by using FIG. 8.

The provider management information 323 is information for managing characteristics of providers. The business operation history management information 333 is information for managing business operation histories. The provider evaluation management information 343 is information for managing evaluation of providers. The data structures of the provider management information 323, the business operation history management information 333 and the provider evaluation management information 343 are explained by using FIG. 9.

Figure 4:
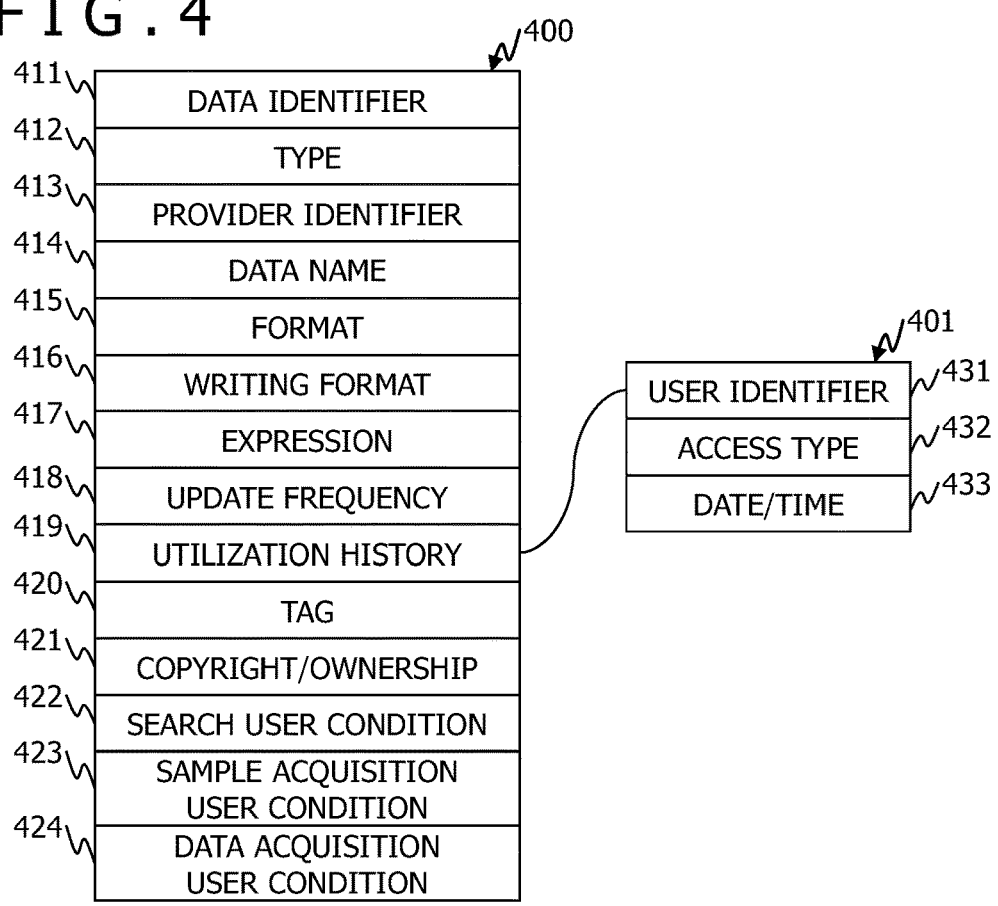
FIG. 4 is a figure depicting examples of the data structures of data management information and access history management information managed by the coordination system in the first embodiment.

FIG. 4 is a figure depicting examples of the data structures of the data management information 221 and the access history management information 231 managed by the coordination system 120 in the first embodiment.

A structure 400 represents management data stored in the data management information 221. There is one structure 400 for one piece of data.

The structure 400 includes a data identifier 411, a type 412, a provider identifier 413, a data name 414, a format 415, a writing format 416, an expression 417, update frequency 418, a utilization history 419, a tag 420, a copyright/ownership 421, a search user condition 422, a sample acquisition user condition 423 and a data acquisition user condition 424. Note that the structure 400 may include fields (members) that are not depicted.

The data identifier 411 is a field that stores an identifier of data in the operation system 101. The type 412 is a field that stores the type of the data. For example, a value representing static data, accumulative data, data to be updated, push type data, pull type data or the like is stored. The data name 414 is a field that stores a name of the data. The format 415, the writing format 416 and the expression 417 are fields that store the format, writing format and expression of the data. The update frequency 418 is a field that stores the update frequency of the data. The copyright/ownership 421 is a field that stores the copyright and ownership of the data.

The provider identifier 413 is a field that stores an identifier of a provider of the data.

The utilization history 419 is a field that stores therein a pointer to a structure 401 representing management data that is stored in the access history management information 231, and is for managing an access history. The utilization history 419 can store a plurality of pointers. Note that, instead of storing pointers, the utilization history 419 may store a set of an identifier and an access count of a user.

The tag 420 is a field that stores a tag to be used for searching for the data.

The search user condition 422 is a field that stores a condition of users who are to be permitted to search for the data. For example, a condition about access rights, comprehensive evaluation values and the like of users is stored.

The sample acquisition user condition 423 is a field that stores a condition of users who are to be permitted to acquire the data as a sample.

The data acquisition user condition 424 is a field that stores a condition of users who are to be permitted to acquire the data.

The structure 401 includes a user identifier 431, an access type 432 and a date/time 433. Note that the structure 401 may include fields that are not depicted. There is one structure 401 for one access history.

The user identifier 431 is a field that stores an identifier of a user who has accessed the data. The access type 432 is a field that stores the type of the access to the data. For example, "search," "sample acquisition," "acquisition" or the like is stored. The date/time 433 is a field that stores the date/time when there has been the access to the data.

Note that the data structures of the data management information 221 and the access history management information 231 depicted in FIG. 4 are merely examples, and are not the sole examples.

Figure 5:
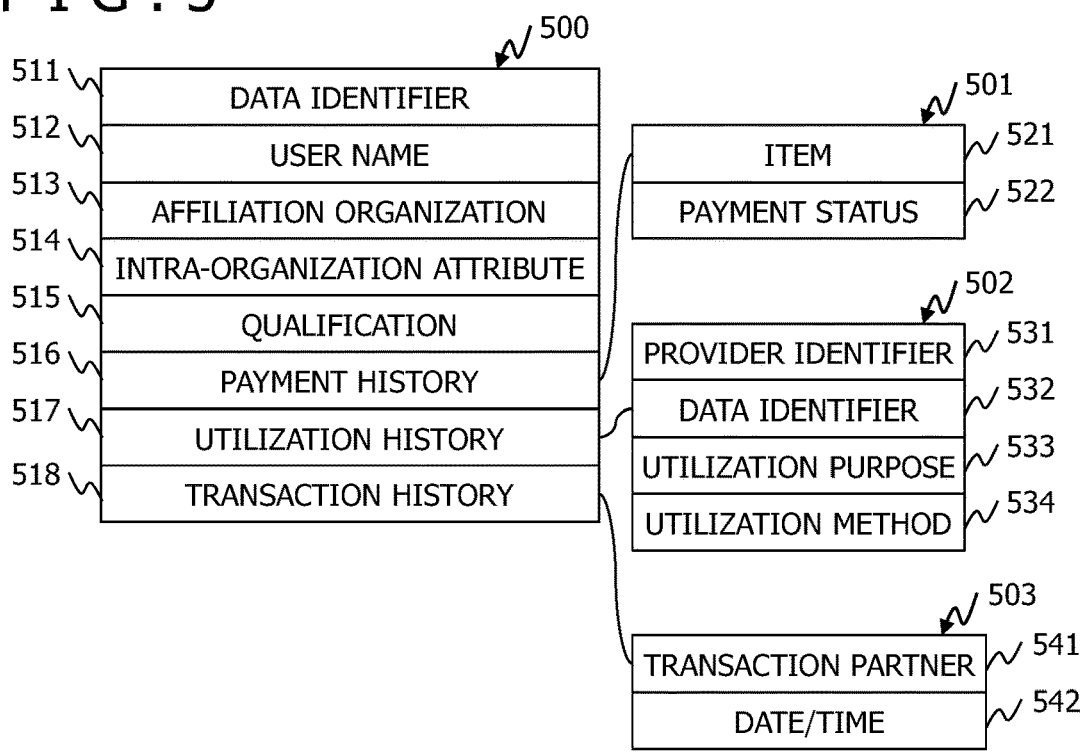
FIG. 5 is a figure depicting examples of the data structures of user management information and user history management information managed by the coordination system in the first embodiment.

FIG. 5 is a figure depicting examples of the data structures of the user management information 222 and the user history management information 232 managed by the coordination system 120 in the first embodiment.

A structure 500 represents management data stored in the user management information 222. There is one structure 500 for one user.

The structure 500 includes a user identifier 511, a user name 512, an affiliation organization 513, an intra-organization attribute 514, a qualification 515, a payment history 516, a utilization history 517 and a transaction history 518. Note that the structure 500 may include fields that are not depicted.

The user identifier 511 is a field that stores an identifier of a user in the operation system 101. The user name 512 is a field that stores a name of the user. The affiliation organization 513 is a field that stores a name or the like of an organization to which the user belongs. The intra-organization attribute 514 is a field that stores the type of occupation, position or the like of the user in the organization. The qualification 515 is a field that stores a qualification that the user has. For example, information such as a lawyer or a physician is stored.

The payment history 516 is a field that stores therein a pointer to a structure 501 representing management data that is stored in the user history management information 232, and is for managing a history (payment history) related to payment associated with utilization of services or the like which is one of user histories.

The utilization history 517 is a field that stores therein a pointer to a structure 502 representing management data that is stored in the user history management information 232, and is for managing a history (utilization history) related to utilization of data which is one of the user histories.

The transaction history 518 is a field that stores therein a pointer to a structure 503 representing management data that is stored in the user history management information 232, and is for managing a history (transaction history) related to transaction by the user which is one of the user histories.

There is one structure 501 for one payment history. The structure 501 includes an item 521 and a payment status 522. Note that the structure 501 may include fields that are not depicted. The item 521 is a field that stores a payment item. The payment status 522 is a field that stores an indication whether or not the payment has been made, the amount of money paid or the like.

There is one structure 502 for one utilization history. The structure 502 includes a provider identifier 531, a data identifier 532, a utilization purpose 533 and a utilization method 534. Note that the structure 502 may include fields that are not depicted. The provider identifier 531 is a field that stores an identifier of a provider who provides accessed data. The data identifier 532 is a field that stores an identifier of the utilized data. The utilization purpose 533 is a field that stores a utilization purpose of the data. For example, application development, data analysis or the like is stored. The utilization method 534 is a field that stores a specific utilization method of the data.

There is one structure 503 for one transaction history. The structure 503 includes a transaction partner 541 and a date/time 542. Note that the structure 503 may include fields that are not depicted. The transaction partner 541 is a field that stores a name or the like of a transaction partner. The date/time 542 is a field that stores the transaction date/time.

Note that the structure 500 may include fields that store values related to the performance, availability and the like of a data utilization system 130 utilized by the user.

Note that the data structures of the user management information 222 and the user history management information 232 depicted in FIG. 5 are merely examples, and are not the sole examples.

Figure 6:
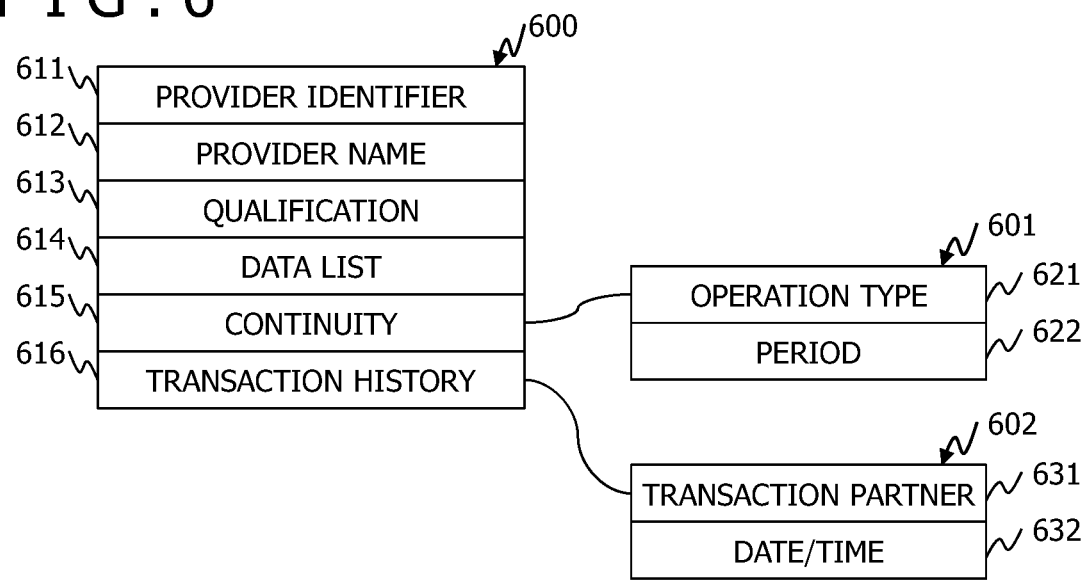
FIG. 6 is a figure depicting examples of the data structures of provider management information and business operation history management information managed by the coordination system in the first embodiment.

FIG. 6 is a figure depicting examples of the data structures of the provider management information 223 and the business operation history management information 233 managed by the coordination system 120 in the first embodiment.

A structure 600 represents management data stored in the provider management information 223. There is one structure 600 for one provider (one enterprise).

The structure 600 includes: a provider identifier 611, a provider name 612, a qualification 613, a data list 614, a continuity 615 and a transaction history 616. Note that the structure 600 may include fields that are not depicted.

The provider identifier 611 is a field that stores an identifier of a provider in the operation system 101. The provider name 612 is a field that stores a name of the provider. The qualification 613 is a field that stores a qualification that the provider has. The qualification 613 stores a qualification, a license, a right or the like that is necessary for business operation related to the provider.

The data list 614 is a field that stores a list of identifiers of data. Note that in a case where the coordination system 120 retains data, the data list 614 may store a list of pointers for accessing pieces of data.

The continuity 615 is a field that stores therein a pointer to a structure 601 representing management data that is stored in the business operation history management information 233, and is for managing a history (operation history) related to business operation of the provider which is one of business operation histories.

The transaction history 616 is a field that stores therein a pointer to a structure 602 representing management data that is stored in the business operation history management information 233, and is for managing a history (transaction history) related to transaction of the provider which is one of the business operation histories.

There is one structure 601 for one operation history. The structure 601 includes an operation type 621 and a period 622. Note that the structure 601 may include fields that are not depicted. The operation type 621 is a field that stores the operation status of business operation. For example, normal business operation, business operation suspension or the like is stored. The period 622 is a field that stores the period during which the business operation had been kept continued.

There is one structure 602 for one transaction history. The structure 602 includes a transaction partner 631 and a date/time 632. Note that the structure 602 may include fields that are not depicted. The transaction partner 631 is a field that stores a name or the like of a transaction partner. The date/time 632 is a field that stores the transaction date/time.

Note that the structure 600 may include fields that store values related to the performance, availability and the like of a data provision system 110.

Note that the data structures of the provider management information 223 and the business operation history management information 233 depicted in FIG. 6 are merely examples, and are not the sole examples.

Figure 7:
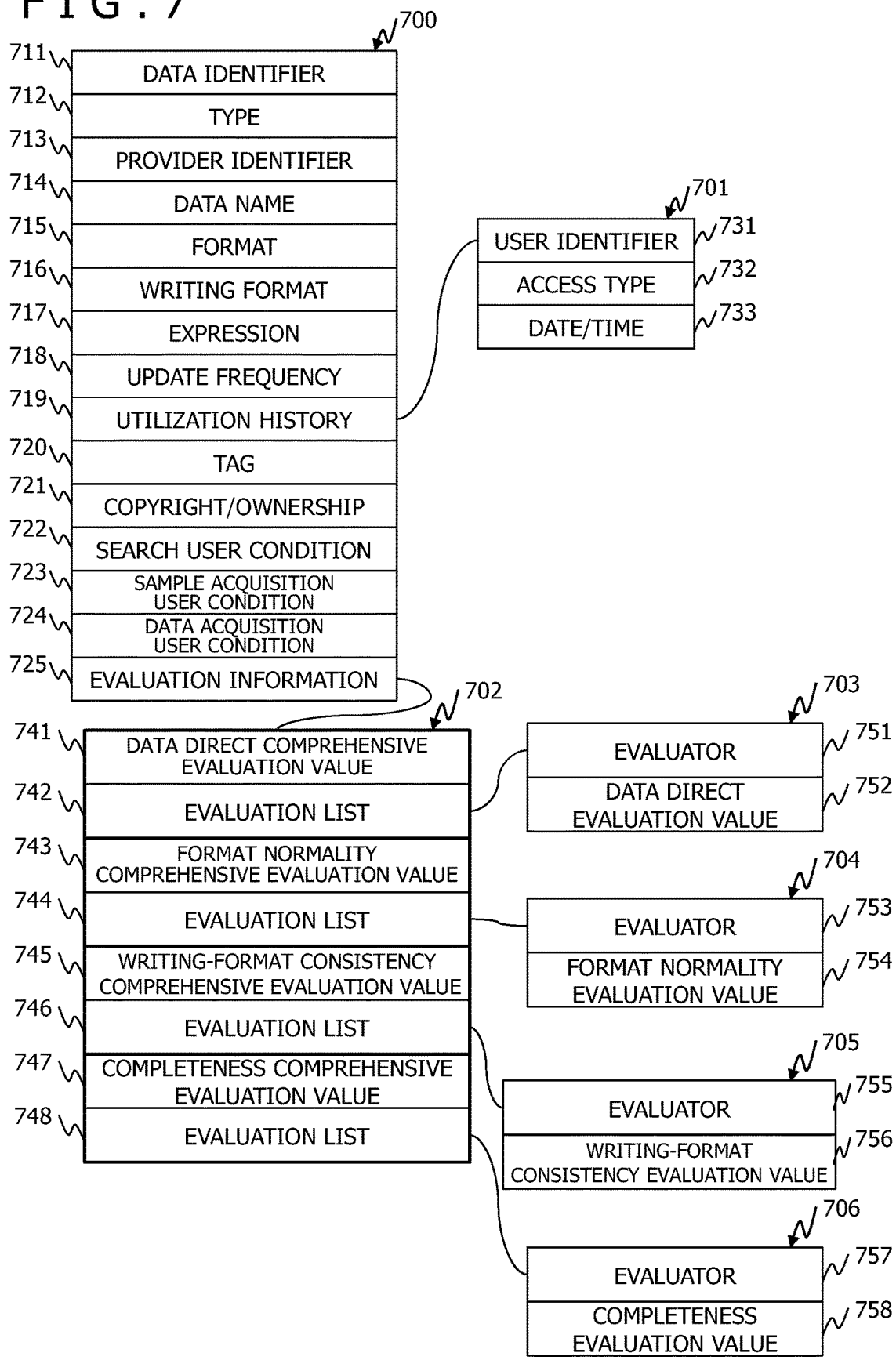
FIG. 7 is a figure depicting examples of the data structures of data management information, access history management information and data evaluation management information managed by the platform system in the first embodiment.

FIG. 7 is a figure depicting examples of the data structures of the data management information 321, the access history management information 331 and the data evaluation management information 341 managed by the platform system 100 in the first embodiment.

A structure 700 represents management data stored in the data management information 321. There is one structure 700 for one piece of data.

The structure 700 includes a data identifier 711, a type 712, a provider identifier 713, a data name 714, a format 715, a writing format 716, an expression 717, an update frequency 718, a utilization history 719, a tag 720, a copyright/ownership 721, a search user condition 722, a sample acquisition user condition 723, a data acquisition user condition 724 and evaluation information 725. Note that the structure 700 may include fields that are not depicted.

The structure 700 is different from the structure 400 in that it includes the evaluation information 725. The fields of the structure 700 other than the evaluation information 725 are identical to the fields of the structure 400.

Note that the utilization history 719 stores therein a pointer to a structure 701 representing management data that is stored in the access history management information 331, and is for managing an access history. A user identifier 731, an access type 732 and a date/time 733 of the structure 701 are identical to the user identifier 431, the access type 432 and the date/time 433 of the structure 401.

The evaluation information 725 stores therein a pointer to a structure 702 representing management data that is stored in the data evaluation management information 341, and is for managing the quality of the data. There is one structure 702 for one piece of data.

The structure 702 includes a data direct comprehensive evaluation value 741, an evaluation list 742, a format normality comprehensive evaluation value 743, an evaluation list 744, a writing-format consistency comprehensive evaluation value 745, an evaluation list 746, a completeness comprehensive evaluation value 747 and an evaluation list 748. Note that the structure 702 may include fields that are not depicted.

The data direct comprehensive evaluation value 741 is a field that stores a comprehensive evaluation value related to the data usefulness. The data direct comprehensive evaluation value 741 stores the average value of data direct evaluation values given by a plurality of evaluators, for example. In addition, it may be the sum total of the products of the data direct evaluation values and weights corresponding to evaluation of the evaluators (user direct evaluation values and provider direct evaluation values), corresponding to the numbers of transaction partners or the like. In addition, in a case where the data direct evaluation values are not numerical values, the ratio or the like of the values is calculated as the comprehensive evaluation value.

The data direct evaluation values are determined on the basis of the subjectivity of the evaluators. For example, they are given as values of 5-grade evaluation. Note that the data direct evaluation values may be determined automatically by systems such as data provision systems 110.

The evaluation list 742 stores therein a pointer to a structure 703 representing management data that is stored in the data evaluation management information 341, and is for managing data direct evaluation.

The format normality comprehensive evaluation value 743 is a field that stores a comprehensive evaluation value related to the data format. The format normality comprehensive evaluation value 743 stores the average value of format normality evaluation values given by a plurality of evaluators, for example. In addition, it may be the sum total of the products of the format normality evaluation values and weights corresponding to evaluation of the evaluators (user direct evaluation values and provider direct evaluation values), corresponding to the numbers of transaction partners or the like. In addition, in a case where the format normality evaluation values are not numerical values, the ratio or the like of the values is calculated as the comprehensive evaluation value.

The format normality evaluation values are values representing high ratings in a case where the data format is a normal format or a de facto format, and are values representing low ratings in a case where the data format is an original format.

The evaluation list 744 stores therein a pointer to a structure 704 representing management data that is stored in the data evaluation management information 341, and is for managing format evaluation.

The writing-format consistency comprehensive evaluation value 745 is a field that stores a comprehensive evaluation value related to the data writing format. The writing-format consistency comprehensive evaluation value 745 stores the average value of writing-format consistency evaluation values given by a plurality of evaluators, for example. Note that it may be the sum total of the products of the writing-format consistency evaluation values and weights corresponding to evaluation of the evaluators (user direct evaluation values and provider direct evaluation values), corresponding to the numbers of transaction partners or the like. In addition, in a case where the writing-format consistency evaluation values are not numerical values, the ratio or the like of the values is calculated as the comprehensive evaluation value.

The writing-format consistency evaluation values are values representing high ratings in a case where the writing format conforms to a writing format designated by the evaluators, and are values representing low ratings in a case where the writing format does not conform to the writing format designated by the evaluators.

The evaluation list 746 stores therein a pointer to a structure 705 representing management data that is stored in the data evaluation management information 341, and is for managing writing format evaluation.

The completeness comprehensive evaluation value 747 is a field that stores a comprehensive evaluation value related to the data completeness. Here, the data completeness represents that elements (rows), values (columns), the value range, the value types and the like included in the data are in line with conditions. The completeness comprehensive evaluation value 747 stores the average value of completeness evaluation values given by a plurality of evaluators, for example. Note that it may be the sum total of the products of the completeness evaluation values and weights corresponding to evaluation of the evaluators (user direct evaluation values and provider direct evaluation values).

The completeness evaluation values are values representing high ratings in a case where the data does not lack any element or value or in a case where the value range or the value types conforms/conform to definitions. On the other hand, the completeness evaluation values are values representing low ratings in a case where the data lacks any element or value or in a case where the value range or the value types does/do not conform to definitions.

The evaluation list 748 stores therein a pointer to a structure 706 representing management data that is stored in the data evaluation management information 341, and is for managing completeness evaluation.

Note that the evaluation values mentioned before representing the quality of the data are merely examples, and are not the sole examples. For example, evaluation values related to the frequency of data acquisition, the validity of the copyright/ownership and the like may be included.

There are one structure 703, one structure 704, one structure 705 and one structure 706 for one evaluator.

The structure 703 includes an evaluator 751 and a data direct evaluation value 752. The structure 704 includes an evaluator 753 and a format normality evaluation value 754. The structure 705 includes an evaluator 755 and a writing-format consistency evaluation value 756. The structure 706 includes an evaluator 757 and a completeness evaluation value 758.

The evaluators 751, 753, 755 and 757 are fields that store identifiers of evaluators.

The data direct evaluation value 752 is a field that stores a data direct evaluation value. The format normality evaluation value 754 is a field that stores a format normality evaluation value. The writing-format consistency evaluation value 756 is a field that stores a writing-format consistency evaluation value. The completeness evaluation value 758 is a field that stores a completeness evaluation value.

Note that the data management information 321 and the data evaluation management information 341 may be managed as one piece of information. In this case, the structure 700 is a structure including the structure 702. That is, the evaluation values also are treated as attributes.

Note that the data structures of the data management information 321, the access history management information 331 and the data evaluation management information 341 depicted in FIG. 7 are merely examples, and are not the sole examples.

Figure 8:
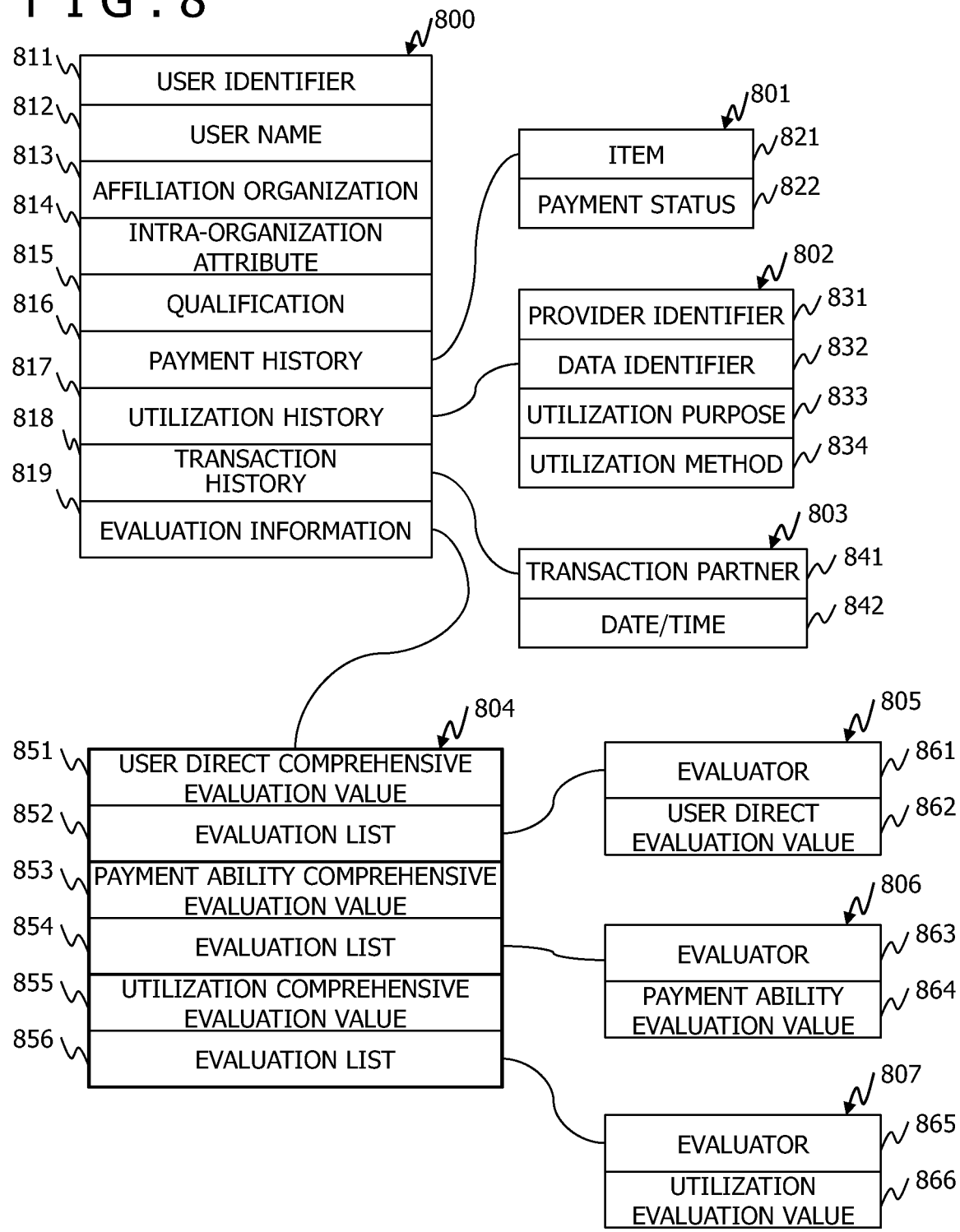
FIG. 8 is a figure depicting examples of the data structures of user management information, user history management information and user evaluation management information managed by the platform system in the first embodiment.

FIG. 8 is a figure depicting examples of the data structures of the user management information 322, the user history management information 332 and the user evaluation management information 342 managed by the platform system 100 in the first embodiment.

A structure 800 represents data stored in the user management information 322. There is one structure 800 for one user.

The structure 800 includes a user identifier 811, a user name 812, an affiliation organization 813, an intra-organization attribute 814, a qualification 815, a payment history 816, a utilization history 817, a transaction history 818 and evaluation information 819. Note that the structure 800 may include fields that are not depicted.

The structure 800 is different from the structure 500 in that it includes the evaluation information 819. The fields of the structure 800 other than the evaluation information 819 are identical to the fields of the structure 500.

Note that the payment history 816 stores therein a pointer to a structure 801 representing management data that is stored in the user history management information 332, and is for managing a payment history. An item 821 and a payment status 822 of the structure 801 are identical to the item 521 and the payment status 522 of the structure 501. The utilization history 817 stores therein a pointer to a structure 802 representing management data that is stored in the user history management information 332, and is for managing a utilization history. A provider identifier 831, a data identifier 832, a utilization purpose 833 and a utilization method 834 of the structure 802 are identical to the provider identifier 531, the data identifier 532, the utilization purpose 533 and the utilization method 534 of the structure 502. The transaction history 818 stores therein a pointer to a structure 803 representing management data that is stored in the user history management information 332, and is for managing a transaction history. A transaction partner 841 and a date/time 842 of the structure 803 are identical to the transaction partner 541 and the date/time 542 of the structure 503.

The evaluation information 819 stores therein a pointer to a structure 804 representing management data that is stored in the user evaluation management information 342, and is for managing evaluation related to the user credibility. There is one structure 804 for one user.

The structure 804 includes a user direct comprehensive evaluation value 851, an evaluation list 852, a payment ability comprehensive evaluation value 853, an evaluation list 854, a utilization comprehensive evaluation value 855 and an evaluation list 856. Note that the structure 804 may include fields that are not depicted.

The user direct comprehensive evaluation value 851 is a field that stores a comprehensive evaluation value related to the user credibility. The user direct comprehensive evaluation value 851 stores the average value of user direct evaluation values given by a plurality of evaluators, for example. Note that it may be the sum total of the products of the user direct evaluation values and weights corresponding to evaluation of the evaluators (user direct evaluation values and provider direct evaluation values).

The user direct evaluation values are determined on the basis of the subjectivity of the evaluators. For example, they are given as values of 5-grade evaluation. Note that the user direct evaluation values may be determined automatically by systems such as data utilization systems 130.

The evaluation list 852 stores therein a pointer to a structure 805 representing management data that is stored in the user evaluation management information 342, and is for managing user direct evaluation.

The payment ability comprehensive evaluation value 853 is a field that stores a comprehensive evaluation value related to the user payment ability. The payment ability comprehensive evaluation value 853 stores the average value of payment ability evaluation values given by a plurality of evaluators, for example. Note that it may be the sum total of the products of the payment ability evaluation values and weights corresponding to evaluation of the evaluators (user direct evaluation values and provider direct evaluation values).

The payment ability evaluation values are values representing high ratings in a case where the payments have been made, and are values representing low ratings in a case where the payments have not been made.

The evaluation list 854 stores therein a pointer to a structure 806 representing management data that is stored in the user evaluation management information 342, and is for managing payment ability evaluation.

The utilization comprehensive evaluation value 855 is a field that stores a comprehensive evaluation value related to whether data has been made use of by the user. The utilization comprehensive evaluation value 855 stores the average value of utilization evaluation values given by a plurality of evaluators, for example. Note that it may be the sum total of the products of the utilization evaluation values and weights corresponding to evaluation of the evaluators (user direct evaluation values and provider direct evaluation values).

The utilization evaluation values are values representing high ratings in a case where data has been made use of, and are values representing low ratings in a case where the data has not been made use of.

The evaluation list 856 stores therein a pointer to a structure 807 representing management data that is stored in the user evaluation management information 342, and is for managing utilization evaluation.

There are one structure 805, one structure 806 and one structure 807 for one evaluator.

The structure 805 includes an evaluator 861 and a user direct evaluation value 862. The structure 806 includes an evaluator 863 and a payment ability evaluation value 864. The structure 807 includes an evaluator 865 and a utilization evaluation value 866.

The evaluators 861, 863 and 865 are fields that store identifiers of evaluators.

The user direct evaluation value 862 is a field that stores a user direct evaluation value. The payment ability evaluation value 864 is a field that stores a payment ability evaluation value. The utilization evaluation value 866 is a field that stores a utilization evaluation value.

Note that the user management information 322 and the user evaluation management information 342 may be managed as one piece of information. In this case, the structure 800 is a structure including the structure 804. That is, the evaluation values also are treated as attributes.

Note that the data structures of the user management information 322, the user history management information 332 and the user evaluation management information 342 depicted in FIG. 8 are merely examples, and are not the sole examples.

Figure 9:
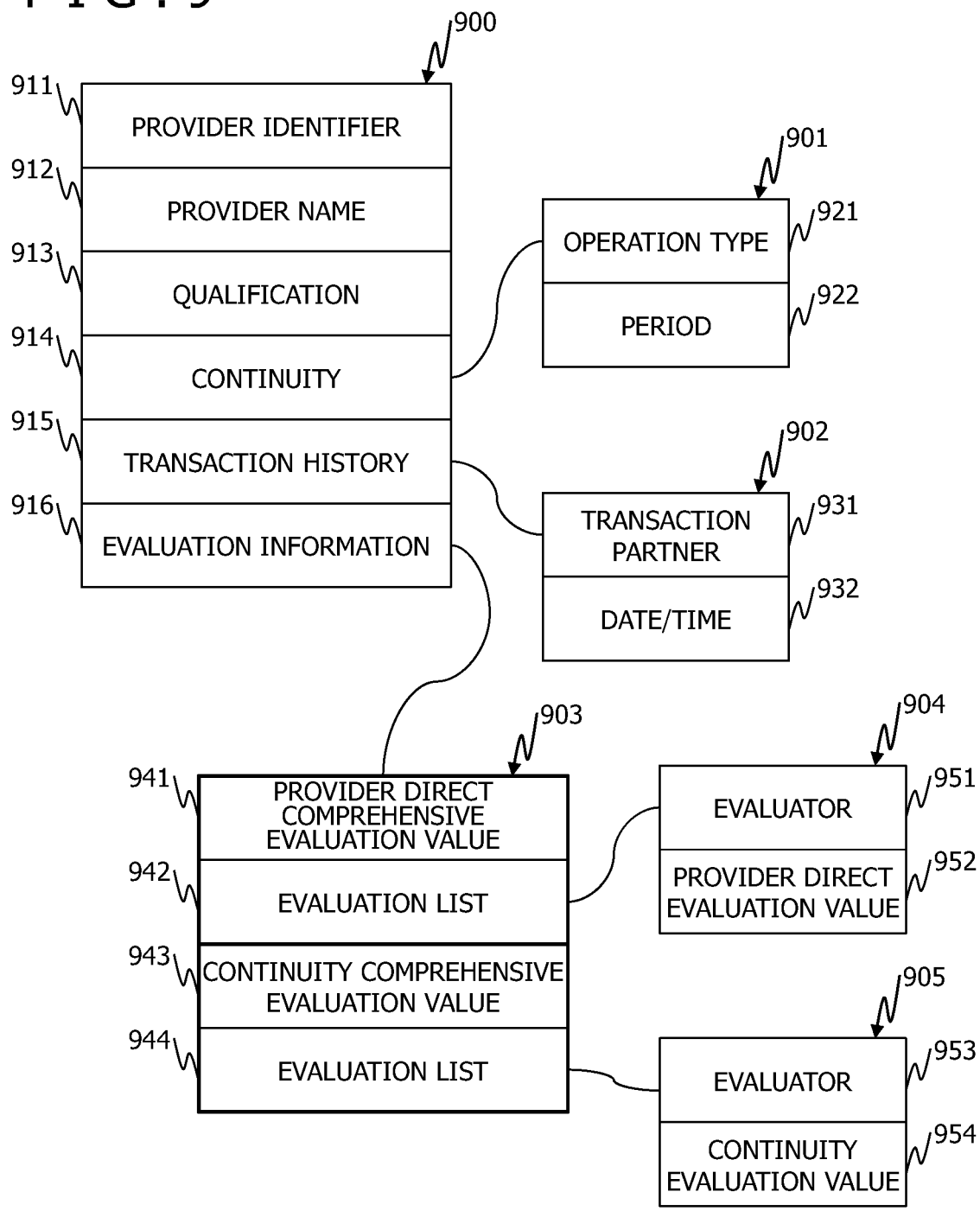
FIG. 9 is a figure depicting examples of the data structures of provider management information, business operation history management information and provider evaluation management information managed by the platform system in the first embodiment.

FIG. 9 is a figure depicting examples of the data structures of the provider management information 323, the business operation history management information 333 and the provider evaluation management information 343 managed by the platform system 100 in the first embodiment.

A structure 900 represents data stored in the provider management information 323. There is one structure 900 for one provider (one enterprise).

The structure 900 includes a provider identifier 911, a provider name 912, a qualification 913, continuity 914, a transaction history 915 and evaluation information 916. Note that the structure 900 may include fields that are not depicted.

The structure 900 is different from the structure 600 in that it does not include the data list 614, and also in that it includes the evaluation information 916. The fields of the structure 900 other than the evaluation information 916 are identical to the fields of the structure 500.

Note that the continuity 914 stores therein a pointer to a structure 901 representing management data that is stored in the business operation history management information 333, and is for managing an operation history. An operation type 921 and a period 922 of the structure 901 are identical to the operation type 621 and the period 622 of the structure 601. The transaction history 915 stores therein a pointer to a structure 902 representing management data that is stored in the business operation history management information 333, and is for managing a transaction history. A transaction partner 931 and a date/time 932 of the structure 902 are identical to the transaction partner 631 and the date/time 632 of the structure 602.

The evaluation information 916 stores therein a pointer to a structure 903 representing management data that is stored in the provider evaluation management information 343, and is for managing evaluation related to the provider credibility. There is one structure 903 for one provider.

The structure 903 includes a provider direct comprehensive evaluation value 941, an evaluation list 942, a continuity comprehensive evaluation value 943 and an evaluation list 944. Note that the structure 903 may include fields that are not depicted.

The provider direct comprehensive evaluation value 941 is a field that stores a comprehensive evaluation value related to the provider credibility. The provider direct comprehensive evaluation value 941 stores the average value of provider direct evaluation values given by a plurality of evaluators, for example. Note that it may be the sum total of the products of the provider direct evaluation values and weights corresponding to evaluation of the evaluators (user direct evaluation values and provider direct evaluation values).

The provider direct evaluation values are determined on the basis of the subjectivity of the evaluators. For example, they are given as values of 5-grade evaluation. Note that the provider direct evaluation values may be determined automatically by systems such as data utilization systems 130.

The evaluation list 942 stores therein a pointer to a structure 904 representing management data that is stored in the provider evaluation management information 343, and is for managing provider direct evaluation.

The continuity comprehensive evaluation value 943 is a field that stores a comprehensive evaluation value related to the continuity of business operation that the provider engages in. The continuity comprehensive evaluation value 943 stores the average value of continuity evaluation values given by a plurality of evaluators, for example. Note that it may be the sum total of the products of the continuity evaluation values and weights corresponding to evaluation of the evaluators (user direct evaluation values and provider direct evaluation values).

The continuity evaluation values are values representing high ratings in a case where the business operation continuation time is long, and are values representing low ratings in a case where the business operation suspension period is long.

The evaluation list 944 stores therein a pointer to a structure 905 representing management data that is stored in the provider evaluation management information 343, and is for managing continuity evaluation.

There are one structure 904 and one structure 905 for one evaluator.

The structure 904 includes an evaluator 951 and a provider direct evaluation value 952. The structure 905 includes an evaluator 953 and a continuity evaluation value 954.

The evaluators 951 and 953 are fields that store identifiers of evaluators.

The provider direct evaluation value 952 is a field that stores a provider direct evaluation value. The continuity evaluation value 954 is a field that stores a continuity evaluation value.

Note that the provider management information 323 and the provider evaluation management information 343 may be managed as one piece of information. In this case, the structure 900 is a structure including the structure 903. That is, the evaluation values also are treated as attributes.

Note that the data structures of the provider management information 323, the business operation history management information 333 and the provider evaluation management information 343 depicted in FIG. 9 are merely examples, and are not the sole examples.

FIG. 10 is a sequence diagram depicting the flow of a registration process in the computer system in the first embodiment.

The sequence diagram depicted in FIG. 10 depicts the flow of a process that is executed in a case where information about attributes of data, a user and a provider is registered in the platform system 100, or these pieces of information are updated.

The platform system 100 receives, from a coordination system 120, a registration request including registration data (Step S101). Note that the registration request may be transmitted from a terminal 160 or the like.

Next, the information managing section 310 of the platform system 100 registers, in the storage apparatus 303, the registration data included in the registration request (Step S102). For example, processes like the ones mentioned below are executed.

In a case where registration data for registering information about data is received, the information managing section 310 generates, in the data management information 321, management data corresponding to the structure 700. The information managing section 310 acquires an access history from the coordination system 120, generates, in the access history management information 331, management data corresponding to the structure 701, and sets, in the utilization history 719, a pointer to the structure 701. In addition, the information managing section 310 generates management data corresponding to the structure 702, and sets, in the evaluation information 725, a pointer to the structure 702.

Note that it is assumed that the data direct comprehensive evaluation value 741, the format normality comprehensive evaluation value 743, the writing-format consistency comprehensive evaluation value 745 and the completeness comprehensive evaluation value 747 of the structure 702 are set to NULL or predetermined initial values.

In a case where registration data for registering information about a user is received, the information managing section 310 generates, in the user management information 322, management data corresponding to the structure 800. In addition, the information managing section 310 acquires a user history from the coordination system 120, generates, in the user history management information 332, management data corresponding to the structures 801, 802 and 803, and sets, in the payment history 816, the utilization history 817 and the transaction history 818, pointers to the structure 801, 802 and 803. In addition, the information managing section 310 generates management data corresponding to the structure 804, and sets, in the evaluation information 819, a pointer to the structure 804. Note that it is assumed that the user direct evaluation value 862, the payment ability evaluation value 864 and the utilization evaluation value 866 of the structure 804 are set to NULL or predetermined initial values.

In a case where registration data for registering information about a provider is received, the information managing section 310 generates, in the provider management information 323, management data corresponding to the structure 900. In addition, the information managing section 310 acquires a business operation history from the coordination system 120, generates, in the business operation history management information 333, management data corresponding to the structures 901 and 902, and sets, in the continuity 914 and the transaction history 915, pointers to the structures 901 and 902. In addition, the information managing section 310 generates management data corresponding to the structure 903, and sets, in the evaluation information 916, a pointer to the structure 903. Note that it is assumed that the provider direct comprehensive evaluation value 941 and the continuity comprehensive evaluation value 943 of the structure 903 are set to NULL or predetermined initial values.

The process at Step S102 has been explained thus far.

Next, the platform system 100 transmits, to the coordination system 120, a response notifying that the registration has been completed (Step S103).

The platform system 100 receives, from the coordination system 120, an update request including update data (Step S111). Note that the update request may be transmitted from a terminal 160 or the like.

Next, on the basis of the update data included in the update request, the information managing section 310 of the platform system 100 updates information stored on the storage apparatus 303 (Step S112). For example, processes like the ones mentioned below are executed.

In a case where update data for updating information about data is received, the information managing section 310 refers to the data management information 321, and searches for a structure 700 corresponding to the update target data. On the basis of the update data, the information managing section 310 updates a certain field of a structure 700 found through the search.

In a case where update data for updating information about a user is received, the information managing section 310 refers to the user management information 322, and searches for a structure 800 corresponding to the update target user. On the basis of the update data, the information managing section 310 updates a certain field of a structure 800 found through the search.

In a case where update data for updating information about a provider is received, the information managing section 310 refers to the provider management information 323, and searches for a structure 900 corresponding to the update target provider. On the basis of the update data, the information managing section 310 updates a certain field of a structure 900 found through the search.

The process at Step S112 has been explained thus far.

Next, the platform system 100 transmits, to the coordination system 120, a response notifying that the updating has been completed (Step S113).

Note that the registration data and the update data may be input by using a terminal connected directly to the platform system 100.

Figure 12:
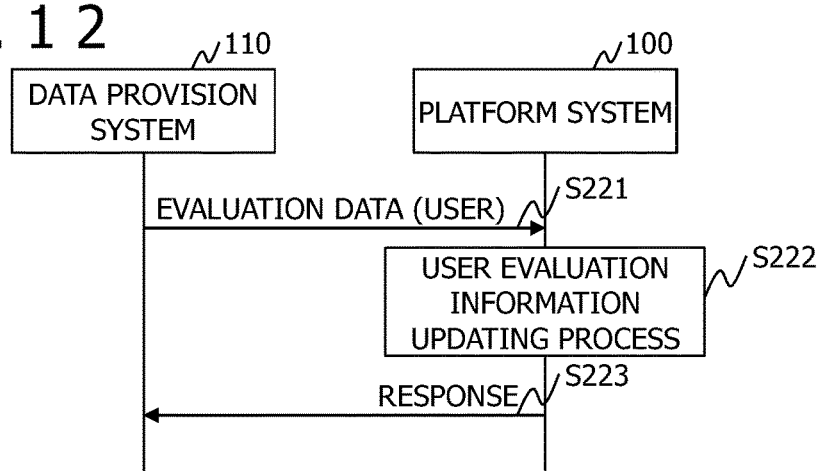
FIG. 12 is a sequence diagram depicting the flow of the process of registering evaluation data in the computer system in the first embodiment.

FIG. 11 and FIG. 12 are sequence diagrams depicting the flow of a process of registering evaluation data in the computer system in the first embodiment.

The sequence diagrams depicted in FIG. 11 and FIG. 12 depict the flow of a process that is executed in a case where information about data, user and provider evaluation is registered in the platform system 100. Note that along with the information about the user evaluation, information about evaluation of an organization to which the user belongs may be registered. In addition, information about a system such as a data utilization system 130 or a data provision system 110 used by a user or a provider may be registered.

Note that, at a certain timing, a user evaluates data and a provider via a data utilization system 130 or a terminal 160, and, at a certain timing, a provider evaluates a user via a data provision system 110.

The platform system 100 receives, from a data utilization system 130, a registration request including evaluation data related to data (Step S201). The evaluation data includes an identifier of the data, an identifier of an evaluator (user) and an evaluation value of each evaluation item. Note that the registration request may be transmitted via a coordination system 120.

Next, the evaluating section 312 of the platform system 100 executes a process of updating the data evaluation management information 341 (Step S202). Specific processes of the process of updating the data evaluation management information 341 are explained with reference to FIG. 13.

Note that the evaluating section 312 does not have to execute the process at Step S202 every time evaluation data is received. For example, in a case where the number of pieces of received evaluation data is larger than a threshold or in a case where an execution interval has passed, the process at Step S202 may be executed. In this case, received evaluation data is accumulated temporarily in a work area or the like.

Next, the platform system 100 transmits, to the data utilization system 130, a response notifying that the registration has been completed (Step S203).

The platform system 100 receives, from the data utilization system 130, a registration request including evaluation data related to a provider (Step S211). The evaluation data includes an identifier of the provider, an identifier of an evaluator (user) and an evaluation value of each evaluation item. Note that the registration request may be transmitted via a coordination system 120.

Next, the evaluating section 312 of the platform system 100 executes a process of updating the provider evaluation management information 343 (Step S212). Specific processes of the process of updating the provider evaluation management information 343 are explained with reference to FIG. 13.

Note that the evaluating section 312 does not have to execute the process at Step S212 every time evaluation data is received. For example, in a case where the number of pieces of received evaluation data is larger than a threshold or in a case where an execution interval has passed, the process at Step S212 may be executed. In this case, received evaluation data is accumulated temporarily in a work area or the like.

Next, the platform system 100 transmits, to the data utilization system 130, a response notifying that the registration has been completed (Step S213).

The platform system 100 receives, from a data provision system 110, a registration request including evaluation data related to a user (Step S221). The evaluation data includes an identifier of the user, an identifier of an evaluator (provider) and an evaluation value of each evaluation item. Note that the registration request may be transmitted via a coordination system 120.

Next, the evaluating section 312 of the platform system 100 executes a process of updating the user evaluation management information 342 (Step S222). Specific processes of the process of updating the user evaluation management information 342 are explained with reference to FIG. 13.

Note that the evaluating section 312 does not have to execute the process at Step S222 every time evaluation data is received. For example, in a case where the number of pieces of received evaluation data is larger than a threshold or in a case where an execution interval has passed, the process at Step S222 may be executed. In this case, received evaluation data is accumulated temporarily in a work area or the like.

Next, the platform system 100 transmits, to the data provision system 110, a response notifying that the registration has been completed (Step S223).

Note that evaluation data may be input by using a terminal connected directly to the platform system 100.

Figure 13:
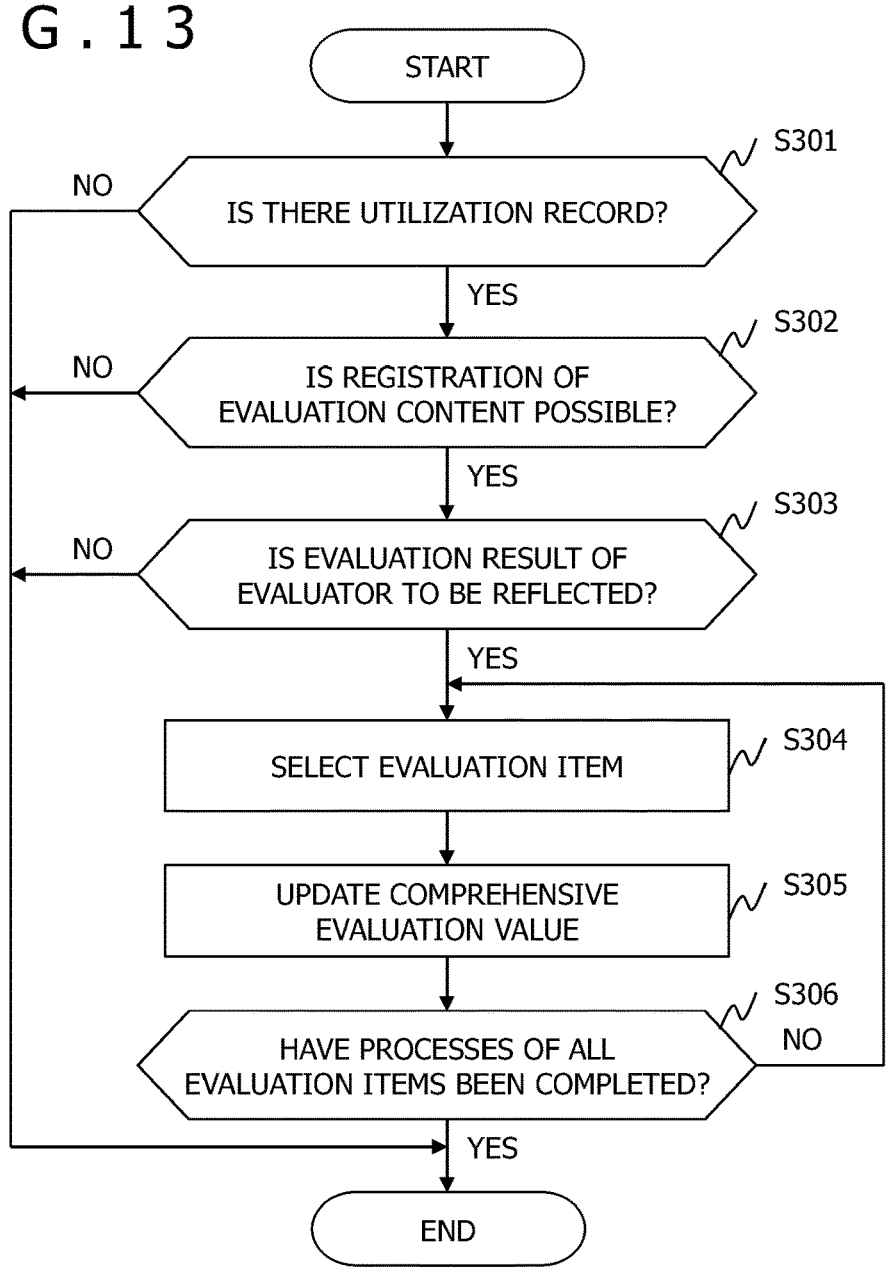
FIG. 13 is a flowchart for explaining an example of a process of updating data evaluation management information executed by the platform system in the first embodiment.

FIG. 13 is a flowchart for explaining an example of a process of updating data evaluation management information 341 executed by the platform system 100 in the first embodiment.

The evaluating section 312 decides whether or not there is a utilization record of evaluation target data (Step S301).

Specifically, the evaluating section 312 refers to the structure 700, and decides whether or not the utilization history 719 has one or more pointers stored therein. In a case where the utilization history 719 has one or more pointers stored therein, the evaluating section 312 decides that there is a utilization record of the evaluation target data. The process at Step S301 is a process for preventing an evaluation result of data that has never been utilized by anyone from being reflected.

In a case where it is decided that there are no utilization records of the evaluation target data, the evaluating section 312 ends the process.

In a case where it is decided that there is a utilization record of the evaluation target data, the evaluating section 312 decides whether or not an evaluation content of the evaluation data can be registered (Step S302). Specifically, processes like the ones mentioned below are executed.

The evaluating section 312 decides whether or not there are structures 703, 704, 705 and 706 corresponding to an identifier of an evaluator (user) included in the evaluation data. In a case where there are no structures 703, 704, 705 and 706 corresponding to the identifier of the evaluator included in the evaluation data, the evaluating section 312 decides that the evaluation content of the evaluation data can be registered.

In a case where there are structures 703, 704, 705 and 706 corresponding to the identifier of the evaluator included in the evaluation data, the evaluating section 312 decides whether or not an update interval has passed. It is assumed that the update interval is preset. In a case where the update interval has passed, the evaluating section 312 decides that the evaluation content of the evaluation data can be registered.

The process at Step S302 is a process for adjusting the update frequency of evaluation by the same evaluator. The process at Step S302 has been explained thus far.

In a case where it is decided that the evaluation content of the evaluation data cannot be registered, the evaluating section 312 ends the process.

In a case where it is decided that the evaluation content of the evaluation data can be registered, the evaluating section 312 decides whether or not to make the evaluation result reflected, on the basis of the evaluation value of the evaluator (Step S303). Specifically, processes like the ones mentioned below are executed.

The evaluating section 312 refers to the user management information 322, and searches for a structure 800 corresponding to the identifier of the evaluator.

On the basis of the evaluation information 819 of a structure 800 found through the search, the evaluating section 312 searches for a structure 804, and acquires a value from the user direct comprehensive evaluation value 851.

The evaluating section 312 compares the user direct comprehensive evaluation value with a threshold, and, on the basis of a result of the comparison, decides whether or not to make the evaluation result reflected. For example, in a case where the user direct comprehensive evaluation value is equal to or higher than the threshold, the evaluating section 312 decides to make the evaluation result reflected.

Note that the evaluation value to be acquired may be an evaluation value other than the user direct comprehensive evaluation value, or a plurality of evaluation values may be acquired. Note that it is assumed that the threshold is preset.

The process at Step S303 is a process for preventing a result of evaluation of a user who has a low rating from being reflected. The process at Step S303 has been explained thus far.

In a case where it is decided not to make the evaluation result reflected, the evaluating section 312 ends the process.

In a case where it is decided to make the evaluation result reflected, the evaluating section 312 selects a target evaluation item from evaluation items included in the evaluation data (Step S304).

Next, the evaluating section 312 updates the comprehensive evaluation value of the target evaluation item (Step S305). Specifically, processes like the ones mentioned below are executed. Here, it is assumed that a data direct evaluation value is selected as the target evaluation item.

The evaluating section 312 generates a structure 703 corresponding to the target evaluation item (data direct evaluation value), and sets a pointer to the structure 703 in the evaluation list 742.

The evaluating section 312 acquires the data direct evaluation values 752 of structures 703 corresponding to pointers set in the evaluation list 742. On the basis of the acquired data direct evaluation value, the evaluating section 312 calculates the data direct comprehensive evaluation value.

The evaluating section 312 sets the data direct comprehensive evaluation value 741 to the calculated value.

Similar processes are executed also for other evaluation items. The process at Step S305 has been explained thus far.

Next, the evaluating section 312 decides whether or not the processes have been completed for all evaluation items included in the evaluation data (Step S306).

In a case where it is decided that the processes have not been completed for all the evaluation items included in the evaluation data, the evaluating section 312 returns to Step S304, and executes similar processes.

In a case where it is decided that the processes have been completed for all the evaluation items included in the evaluation data, the evaluating section 312 ends the process.

A process of updating the user evaluation management information 342 and a process of updating the provider evaluation management information 343 also are processes similar to the process depicted in FIG. 13. Here, the content of different processes is explained.

First, the process of updating the user evaluation management information 342 is explained.

At Step S301, the evaluating section 312 decides whether or not there is a record of utilization of an operation system 101 utilized by an evaluation target user.

Specifically, the evaluating section 312 refers to the utilization history 817 of a structure 800 corresponding to an identifier of the user included in evaluation data, and decides whether or not there is a structure 802 corresponding to an identifier of an evaluator (provider) included in the evaluation data. In a case where there is a structure 802 corresponding to the identifier of the evaluator (provider) included in the evaluation data, the evaluating section 312 decides that there is a record of utilization of the operation system 101 by the evaluation target user.

The process at Step S301 is a process for preventing a result of evaluation of a provider in an operation system 101 that a user has never utilized from being reflected.

Processes like the ones mentioned below are executed at Step S302.

The evaluating section 312 decides whether or not there are structures 805, 806 and 807 corresponding to the identifier of the evaluator (provider) included in the evaluation data. In a case where there are no structures 805, 806 and 807 corresponding to the identifier of the evaluator included in the evaluation data, the evaluating section 312 decides that the evaluation content of the evaluation data can be registered.

In a case where there are structures 805, 806 and 807 corresponding to the identifier of the evaluator included in the evaluation data, the evaluating section 312 decides whether or not an update interval has passed. It is assumed that the update interval is preset. In a case where the update interval has passed, the evaluating section 312 decides that the evaluation content of the evaluation data can be registered.

The process at Step S302 is a process for adjusting the update frequency of evaluation by the same evaluator.

Processes like the ones mentioned below are executed at Step S303.

The evaluating section 312 refers to the provider management information 323, and searches for a structure 900 corresponding to the identifier of the evaluator. On the basis of the evaluation information 916 of a structure 900 found through the search, the evaluating section 312 searches for a structure 903, and acquires a value from the provider direct comprehensive evaluation value 941.

The evaluating section 312 compares the provider direct comprehensive evaluation value with a threshold, and, on the basis of a result of the comparison, decides whether or not to make the evaluation result reflected. For example, in a case where the provider direct comprehensive evaluation value is equal to or higher than the threshold, the evaluating section 312 decides to make the evaluation result reflected.

Note that the evaluation value to be acquired may be an evaluation value other than the provider direct comprehensive evaluation value, or a plurality of evaluation values may be acquired. Note that it is assumed that the threshold is preset.

The process at Step S303 is a process for preventing a result of evaluation of a provider who has a low rating from being reflected.

The processes from Step S304 to Step S306 are different in terms of evaluation items to be updated, but are identical in terms of process content. Accordingly, explanations thereof are omitted.

Next, the process of updating the provider evaluation management information 343 is explained.

At Step S301, the evaluating section 312 decides whether or not there is a record of utilization, by a user, of data provided by an evaluation target provider.

Specifically, the evaluating section 312 refers to the utilization history 817 of a structure 800 corresponding to an identifier of the evaluator (user) included in evaluation data, and decides whether or not there is a structure 802 corresponding to an identifier of the provider included in the evaluation data. In a case where there is a structure 802 corresponding to the identifier of the provider included in the evaluation data, the evaluating section 312 decides that there is a record of utilization, by the user, of the data provided by the evaluation target provider.

The process at Step S301 is a process for preventing a result of evaluation of a user who has never utilized data provided by a provider from being reflected.

Processes like the ones mentioned below are executed at Step S302.

The evaluating section 312 decides whether or not there are structures 904 and 905 corresponding to the identifier of the evaluator (user) included in the evaluation data. In a case where there are no structures 904 and 905 corresponding to the identifier of the evaluator included in the evaluation data, the evaluating section 312 decides that the evaluation content of the evaluation data can be registered.

In a case where there are structures 904 and 905 corresponding to the identifier of the evaluator included in the evaluation data, the evaluating section 312 decides whether or not an update interval has passed. It is assumed that the update interval is preset. In a case where the update interval has passed, the evaluating section 312 decides that the evaluation content of the evaluation data can be registered.

The process at Step S302 is a process for adjusting the update frequency of evaluation by the same evaluator.

Processes like the ones mentioned below are executed at Step S303.

The evaluating section 312 refers to the user management information 322, and searches for a structure 800 corresponding to the identifier of the evaluator. On the basis of the evaluation information 819 of a structure 800 found through the search, the evaluating section 312 searches for a structure 804, and acquires a value from the user direct comprehensive evaluation value 851.

The evaluating section 312 compares the user direct comprehensive evaluation value with a threshold, and, on the basis of a result of the comparison, decides whether or not to make the evaluation result reflected. For example, in a case where the user direct comprehensive evaluation value is equal to or higher than the threshold, the evaluating section 312 decides to make the evaluation result reflected.

Note that the evaluation value to be acquired may be an evaluation value other than the user direct comprehensive evaluation value, or a plurality of evaluation values may be acquired. Note that it is assumed that the threshold is preset.

The process at Step S303 is a process for preventing a result of evaluation of a user who has a low rating from being reflected.

The processes from Step S304 to Step S306 are different in terms of evaluation items to be updated, but are identical in terms of process content. Accordingly, explanations thereof are omitted.

Figure 14:
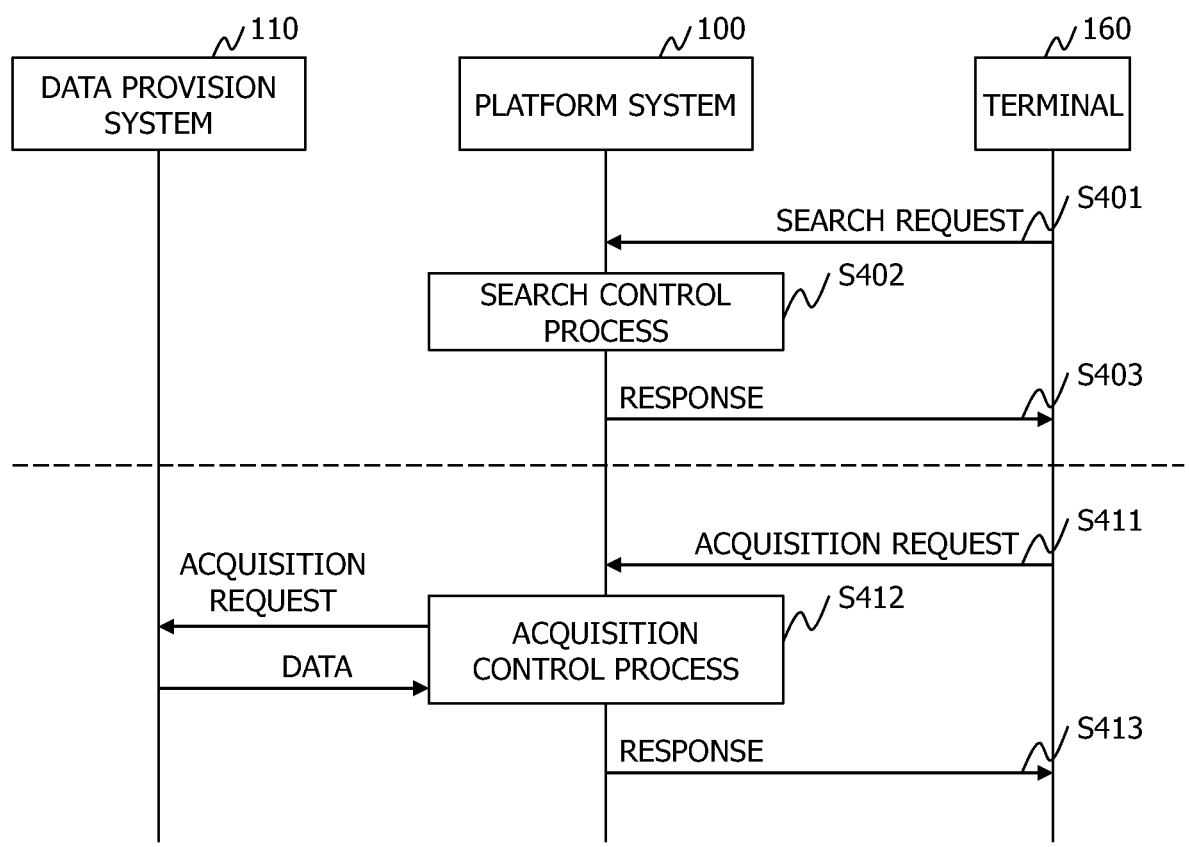
FIG. 14 is a sequence diagram depicting the flow of an access control process in the computer system in the first embodiment.

FIG. 14 is a sequence diagram depicting the flow of an access control process in the computer system in the first embodiment.

The platform system 100 receives a search request from a terminal 160 (Step S401). The search request includes an identifier of a user, a search condition for searching for data, a quality condition related to the quality of the data and a provider condition related to the credibility of a provider. Note that the search request may be transmitted via a coordination system 120 or a data utilization system 130. Note that the search request may include information other than the information mentioned before.

The search condition includes a search key or the like. The quality condition includes at least any of information designating a format, a writing format or the like, and a conditional expression related to a comprehensive evaluation value or the like. In addition, the provider condition includes at least any of information designating a qualification, a transaction count or the like, and a conditional expression related to a comprehensive evaluation value.

The access control section 311 of the platform system 100 executes a search control process (Step S402), and transmits, to the terminal 160, a response including a result of the process (Step S403). Details of the search control process are explained with reference to FIG. 15.

The platform system 100 receives an acquisition request from the terminal 160 (Step S411). The acquisition request includes an identifier of a user, an identifier of data, a quality condition and a provider condition. Note that the acquisition request may be transmitted via a coordination system 120 or a data utilization system 130. Note that the acquisition request may include information other than the information mentioned before.

The access control section 311 of the platform system 100 executes an acquisition control process (Step S412), and transmits, to the terminal 160, a response including a result of the process (Step S413). Details of the acquisition control process are explained with reference to FIG. 16.

Figure 15:
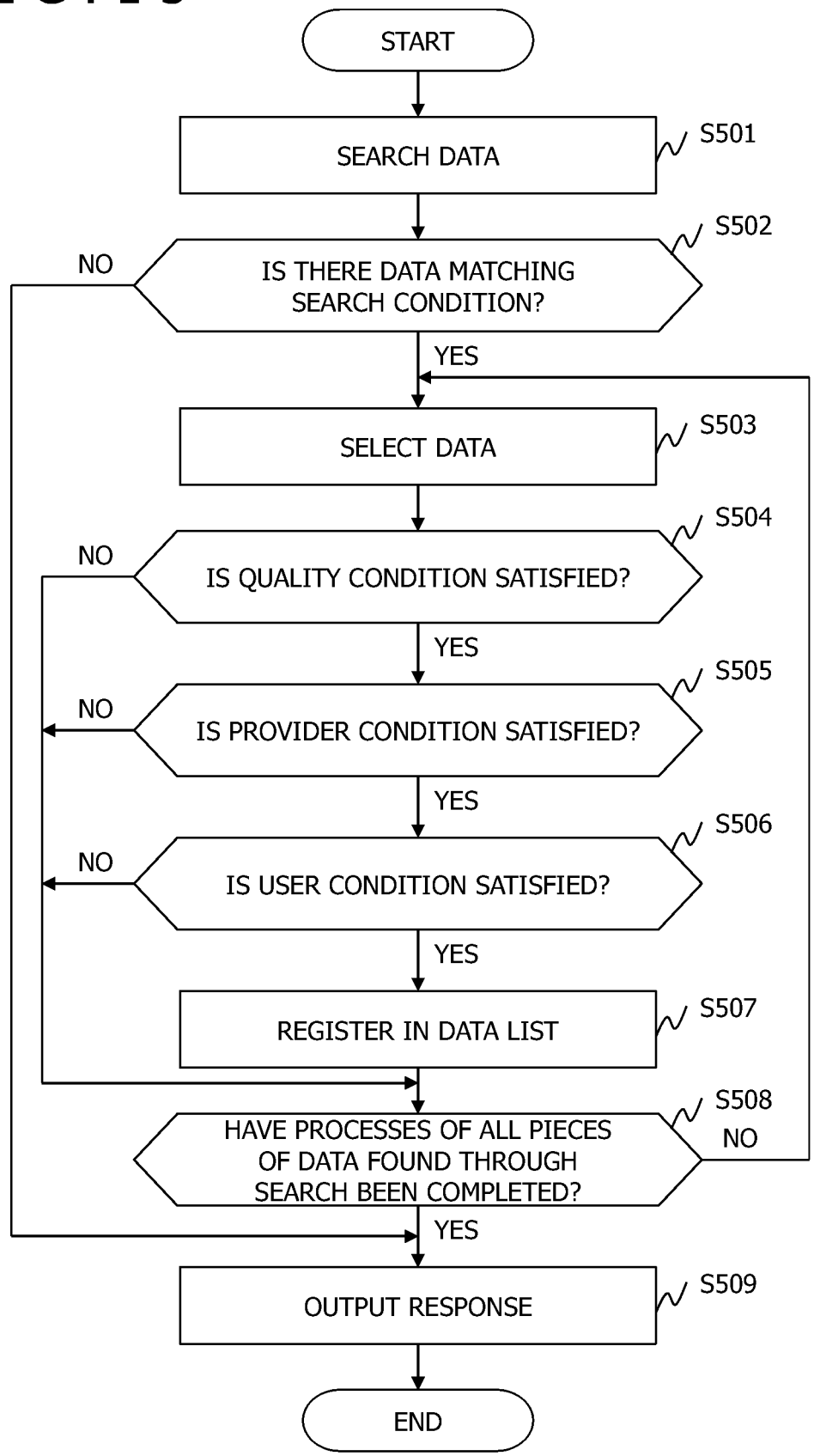
FIG. 15 is a flowchart for explaining an example of a search control process executed by the platform system in the first embodiment.

FIG. 15 is a flowchart for explaining an example of the search control process executed by the platform system 100 in the first embodiment.

The access control section 311 searches for data matching the search condition (Step S501). For example, the access control section 311 refers to the tags 720 in structures 700, and searches for data including a tag corresponding to the search key.

The access control section 311 decides whether or not there is data matching the search condition (Step S502).

In a case where it is decided that there is no data matching the search condition, the access control section 311 outputs a response notifying that there is no data (Step S509), and ends the process.

In a case where it is decided that there is data matching the search condition, the access control section 311 selects target data from the data found through the search (Step S503).

Next, the access control section 311 decides whether or not the target data satisfies the quality condition (Step S504).

Specifically, on the basis of structures 700 and 702 corresponding to the target data, the access control section 311 decides whether or not the quality condition is satisfied. For example, the access control section 311 decides whether the data format matches a designated format, and the data direct comprehensive evaluation value is equal to or higher than 4.0.

In a case where it is decided that the target data does not satisfy the quality condition, the access control section 311 proceeds to Step S508.

In a case where it is decided that the target data satisfies the quality condition, the access control section 311 decides whether or not a provider who provides the target data satisfies the provider condition (Step S505).

Specifically, the access control section 311 acquires an identifier from the provider identifier 713 of the structure 700 corresponding to the target data. On the basis of structures 900 and 903 corresponding to the acquired identifier of the provider, the access control section 311 decides whether or not the provider condition is satisfied. For example, the access control section 311 decides whether there are ten or more transaction partners, and the provider direct comprehensive evaluation value is equal to or higher than 3.7.

In a case where it is decided that the provider who provides the target data does not satisfy the provider condition, the access control section 311 proceeds to Step S508.

In a case where it is decided that the provider who provides the target data satisfies the provider condition, the access control section 311 decides whether or not the user who performs the search satisfies a user condition set by the provider who provides the target data (Step S506).

Specifically, the access control section 311 acquires the user condition set in the search user condition 722 of the structure 700 corresponding to the target data. On the basis of a structure 800 corresponding to the identifier of the user included in the search request, the access control section 311 decides whether or not the acquired user condition is satisfied. For example, the access control section 311 decides whether the user has a predetermined qualification, the user has conducted a predetermined transaction, and the user direct comprehensive evaluation value is equal to or higher than 5.0.

In a case where it is decided that the user who performs the search does not satisfy the user condition set by the provider who provides the target data, the access control section 311 proceeds to Step S508.

In a case where it is decided that the user who performs the search satisfies the user condition set by the provider who provides the target data, the access control section 311 registers the target data in a data list (Step S507), and thereafter proceeds to Step S508. Here, the data list is a list for presenting data found through the search to the user.

At Step S508, the access control section 311 decides whether or not the processes on all pieces of data found through the search have been completed (Step S508).

In a case where it is decided that the processes on all the pieces of data found through the search have not been completed, the access control section 311 returns to Step S503, and executes similar processes.

In a case where it is decided that the processes on all the pieces of data found through the search have been completed, the access control section 311 outputs a response including the data list (Step S509), and ends the process.

Note that the process at Step S506 does not necessarily have to be executed.

Figure 16:
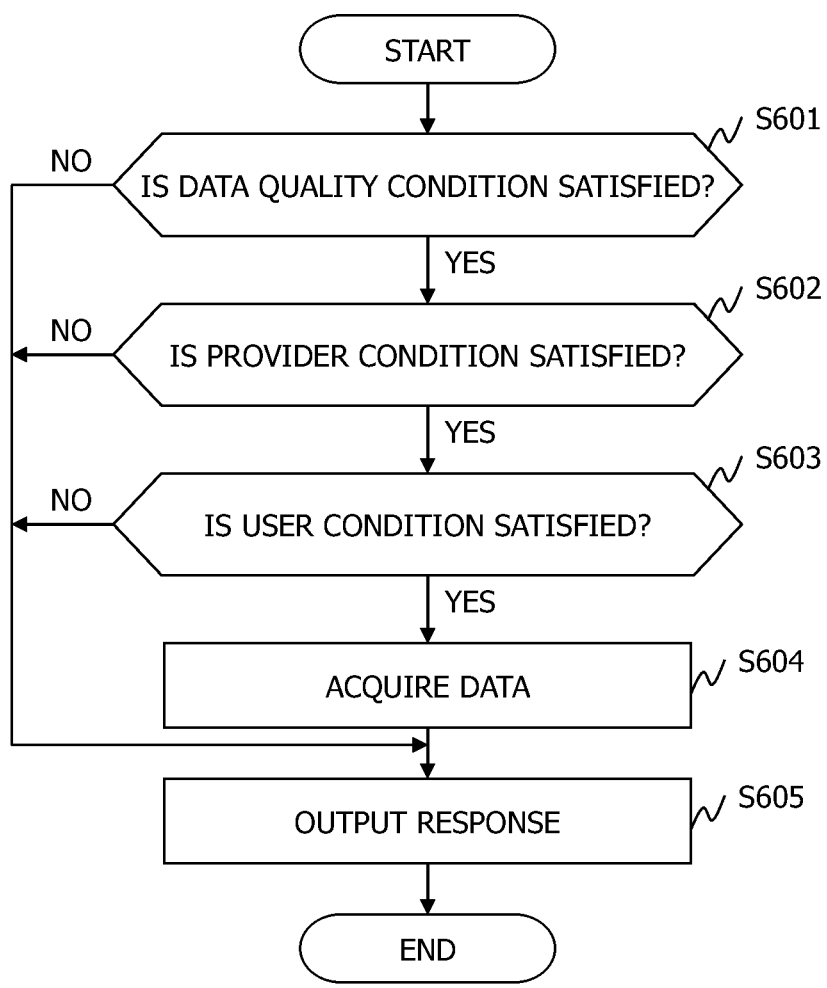
FIG. 16 is a flowchart for explaining an example of an acquisition control process executed by the platform system in the first embodiment.

FIG. 16 is a flowchart for explaining an example of the acquisition control process executed by the platform system 100 in the first embodiment.

The access control section 311 decides whether or not acquisition target data satisfies the quality condition (Step S601). The process at Step S601 is identical to the process at Step S504.

In a case where it is decided that the acquisition target data does not satisfy the quality condition, the access control section 311 outputs a response notifying that the data cannot be acquired (Step S605), and ends the process.

In a case where it is decided that the acquisition target data satisfies the quality condition, the access control section 311 decides whether or not a provider who provides the acquisition target data satisfies the provider condition (Step S602). The process at Step S602 is identical to the process at Step S505.

In a case where it is decided that the provider who provides the acquisition target data does not satisfy the provider condition, the access control section 311 outputs a response notifying that the data cannot be acquired (Step S605), and ends the process.

In a case where it is decided that the provider who provides the acquisition target data satisfies the provider condition, the access control section 311 decides whether or not the user who performs the acquisition satisfies a user condition set by the provider who provides the acquisition target data (Step S603).

Specifically, the access control section 311 acquires the user condition set in the data acquisition user condition 724 of the structure 700 corresponding to the acquisition target data. On the basis of a structure 800 corresponding to the identifier of the user included in the acquisition request, the access control section 311 decides whether or not the acquired user condition is satisfied. For example, the access control section 311 decides whether the user has a predetermined qualification, and has completed the payments of fees associated with data utilization.

In a case where it is decided that the user who performs the acquisition does not satisfy the user condition set by the provider who provides the acquisition target data, the access control section 311 outputs a response notifying that data cannot be acquired (Step S605), and ends the process.

In a case where it is decided that the user who performs the acquisition satisfies the user condition set by the provider who provides the acquisition target data, the access control section 311 acquires the data from the data provision system 110 of an operation system 101 of the provider (Step S604). Furthermore, the access control section 311 outputs a response including the acquired data (Step S605), and ends the process.

Note that the process at Step S603 does not necessarily have to be executed.

Note that in a case where the platform system 100 retains the data, the access control section 311 does not execute the process at Step S604, and a response including the data retained by the platform system 100 is output. Note that instead of acquiring the data, the platform system 100 may perform control such that data transmission/reception can be performed between a data provision system 110 and a terminal 160 or a data utilization system 130.

Note that in a case where a sample acquisition request is received, the access control section 311 decides whether or not the user condition set in the data acquisition user condition 724 is satisfied. Note that in a case where a data acquisition request for acquiring a plurality of pieces of data is received, the access control section 311 executes the processes from Step S601 to Step S605 on each piece of data.

Note that in a case where the platform system 100 sequentially executes the search control process and the acquisition control process, variations like the ones mentioned below are possible.

(Variation 1) The platform system 100 executes the process depicted in FIG. 15 for the search control process, and executes the processes from Step S603 to Step S605 for the acquisition control process.

(Variation 2) The platform system 100 executes the processes from Step S501 to Step S503, and Step S506 to Step S509 for the search control process, and executes the process depicted in FIG. 16 for the acquisition control process.

According to the first embodiment, a user can search for, and also acquire data which is from credible providers, and has quality which is equal to or higher than a certain level. Thereby, safe and useful data access can be realized. In addition, since providers can permit data search or data acquisition only by credible users, safe data provision can be realized.

Second Embodiment

In a second embodiment, the platform system 100 automatically takes in evaluation data managed by coordination systems 120. Hereinafter, the second embodiment is explained with focus on differences from the first embodiment.

The configuration of the computer system in the second embodiment is identical to that in the first embodiment. In the second embodiment, the configurations of the platform system 100 and coordination systems 120 are partially different.

Figure 17:
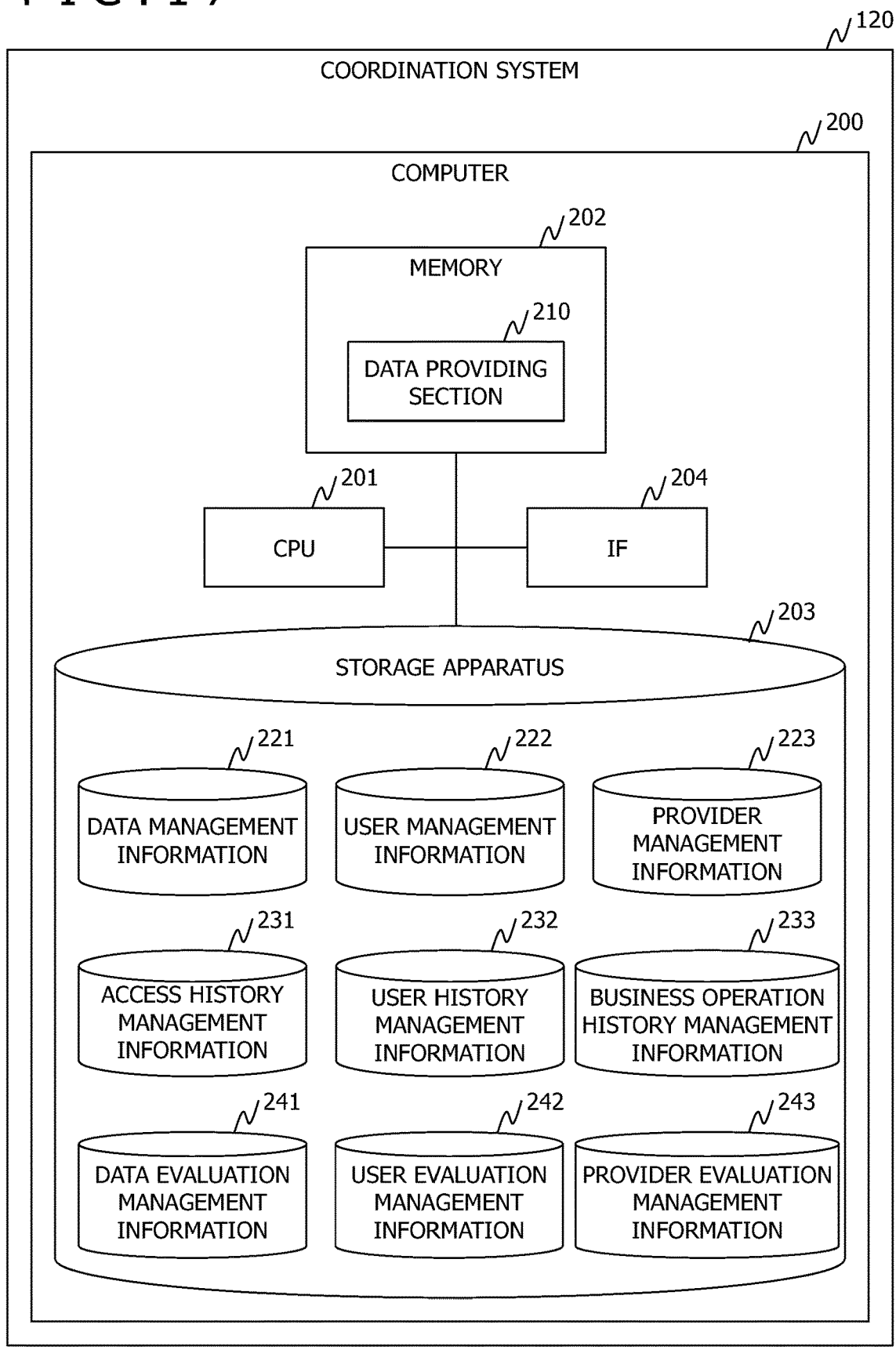
FIG. 17 is a figure depicting a configuration example of a coordination system in a second embodiment.

FIG. 17 is a figure depicting a configuration example of a coordination system 120 in the second embodiment.

The coordination system 120 includes one or more computers 200. Note that the coordination system 120 may include a storage system that stores various types of information, in addition to the computers 200.

The hardware configuration of the computers 200 in the second embodiment is identical to that in the first embodiment. In addition, the functional configuration of the computers 200 in the second embodiment is identical to that in the first embodiment.

In the second embodiment, information stored on the storage apparatus 203 is partially different. Specifically, the storage apparatus 203 in the second embodiment stores data evaluation management information 241, user evaluation management information 242 and provider evaluation management information 243.

In the second embodiment, evaluation of data, users and providers is performed in an operation system 101, and results of the evaluation are accumulated in the coordination system 120. Note that a method of registration of evaluation data is identical to that in the first embodiment, and so detailed explanations are omitted. It should be noted however that registration of evaluation data is performed by the data providing section 210.

The data structures of the data evaluation management information 241, the user evaluation management information 242 and the provider evaluation management information 243 are identical to the data structures of the data evaluation management information 341, the user evaluation management information 342 and the provider evaluation management information 343.

It is assumed in the second embodiment that identifiers included in management data managed by the coordination system 120 are original identifiers of the operation system 101. In addition, it is assumed that the data evaluation management information 241, the user evaluation management information 242 and the provider evaluation management information 243 managed by the coordination system 120 store original evaluation values of the operation system 101.

Figure 18:
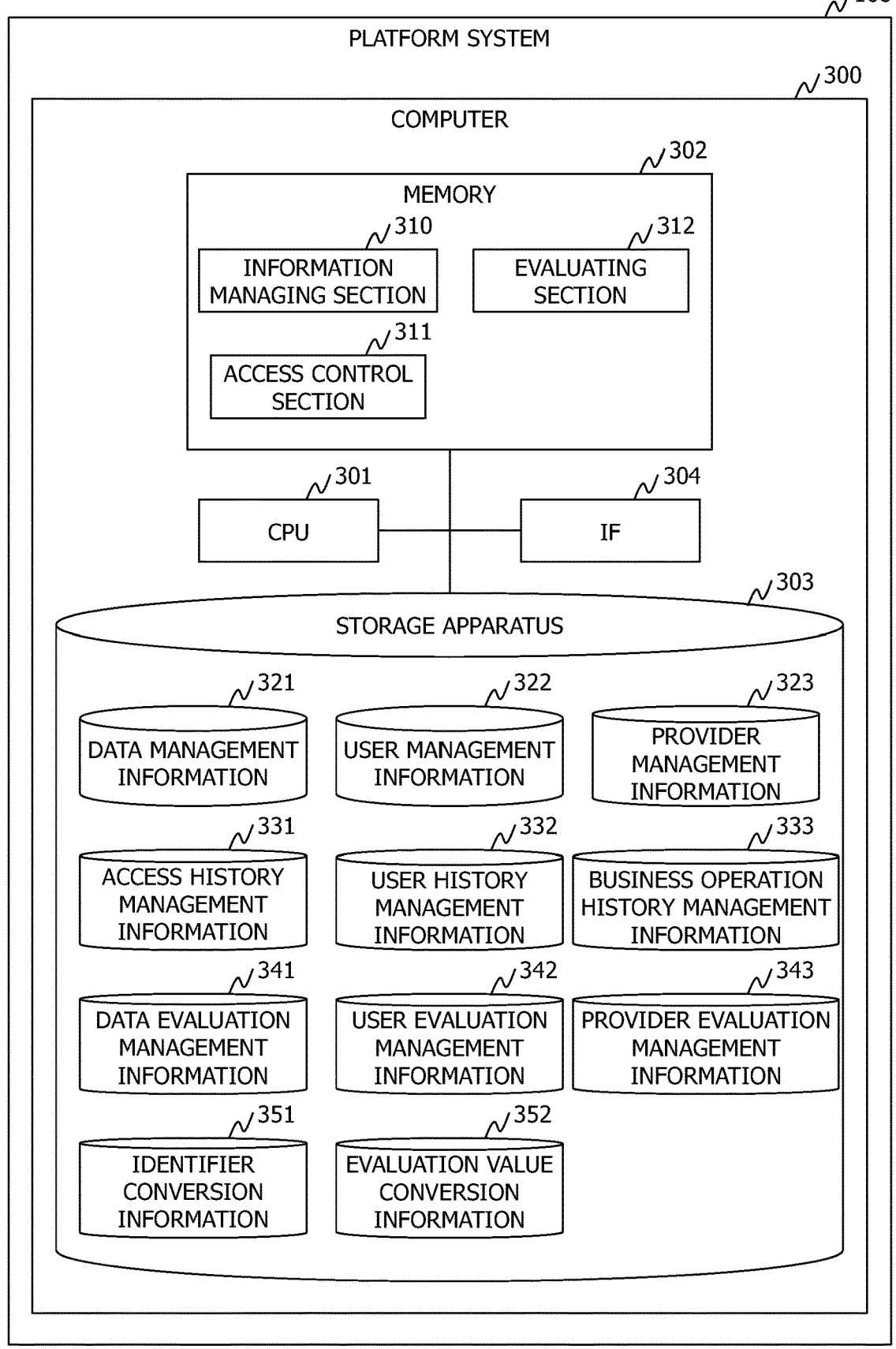
FIG. 18 is a figure depicting a configuration example of the platform system in the second embodiment.

FIG. 18 is a figure depicting a configuration example of the platform system 100 in the second embodiment.

The platform system 100 includes one or more computers 300. Note that the platform system 100 may include a storage system that stores various types of information, in addition to the computers 300.

The hardware configuration of the computers 300 in the second embodiment is identical to that in the first embodiment. In addition, the functional configuration of the computers 300 in the second embodiment is identical to that in the first embodiment.

In the second embodiment, information stored on the storage apparatus 303 is partially different. Specifically, the storage apparatus 303 in the second embodiment stores identifier conversion information 351 and evaluation value conversion information 352.

It is assumed in the second embodiment that identifiers included in management data managed by the platform system 100 are identifiers that are unique in the computer system. In addition, it is assumed that the data evaluation management information 341, the user evaluation management information 342 and the provider evaluation management information 343 managed by the platform system 100 store evaluation values that can be compared between operation systems 101.

The identifier conversion information 351 is information for managing a conversion rule of identifiers included in management data managed by the platform system 100 and identifiers included in management data managed by operation systems 101. The data structure of the identifier conversion information 351 is explained by using FIG. 19.

The evaluation value conversion information 352 is information for managing a conversion rule of each evaluation value included in evaluation data managed by the coordination system 120 in a case where the evaluation data is taken in. The data structure of the evaluation value conversion information 352 is explained by using FIG. 20.

Figures 19, 20, 21:
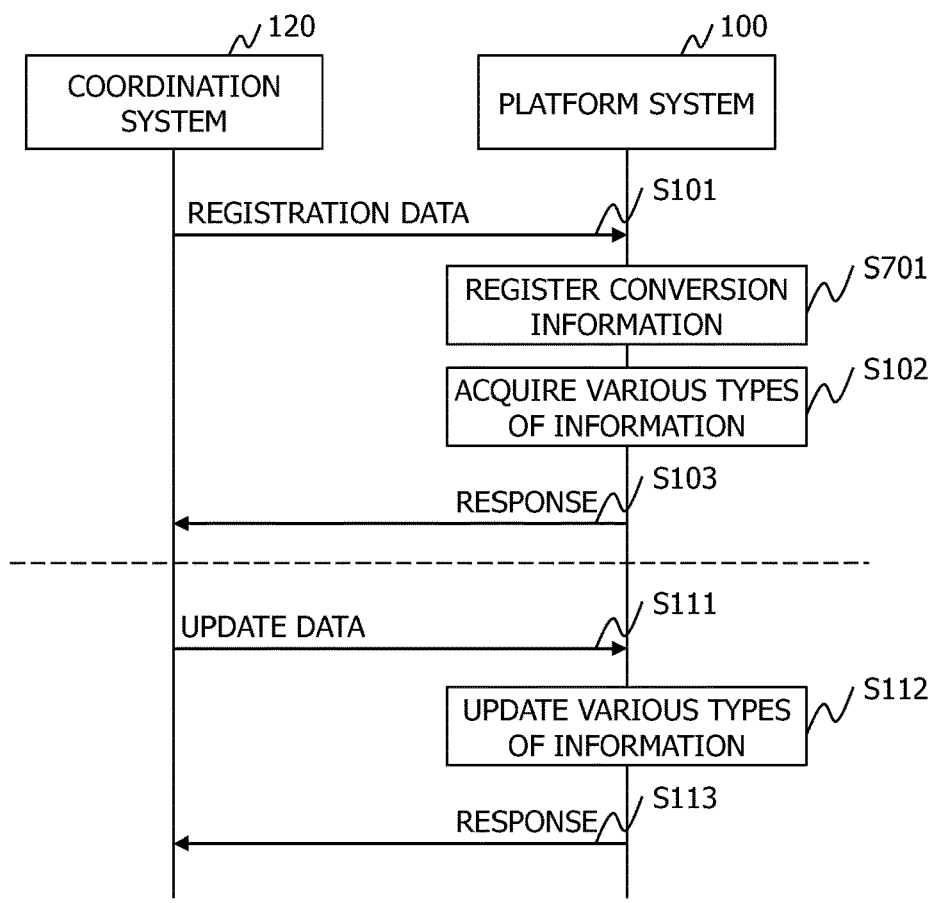
FIG. 19 is a figure depicting an example of the data structure of identifier conversion information in the second embodiment.
FIG. 20 is a figure depicting an example of the data structure of evaluation value conversion information in the second embodiment.
FIG. 21 is a sequence diagram depicting the flow of a registration process in the computer system in the second embodiment.

FIG. 19 is a figure depicting an example of the data structure of the identifier conversion information 351 in the second embodiment.

The identifier conversion information 351 is information in a table format, and includes entries each including a management identifier 1901, a system identifier 1902 and an external identifier 1903. There is one entry for one piece of data, one user or one provider. Note that the entries may include fields other than those mentioned before.

The management identifier 1901 is a field that stores an identifier given to management data (data, a user and a provider) managed by a platform system 100.

The system identifier 1902 is a field that stores identification information of a coordination system 120.

The external identifier 1903 is a field that stores an identifier given to management data (data, a user and a provider) managed by the coordination system 120.

Note that the data structure of the identifier conversion information 351 depicted in FIG. 19 is merely an example, and is not the sole example.

FIG. 20 is a figure depicting an example of the data structure of the evaluation value conversion information 352 in the second embodiment.

The evaluation value conversion information 352 is data in a table format, and includes entries each including an evaluation item 2001, a pre-conversion evaluation value 2002 and a conversion method 2003. There is one entry for one evaluation item. Note that the entries may include fields other than those mentioned before.

The evaluation item 2001 is a field that stores a name or the like of an evaluation item.

The pre-conversion evaluation value 2002 is a field that stores the original evaluation value format, value type or the like of an operation system 101.

The conversion method 2003 is a field that stores a method of converting an original evaluation value of the operation system 101 to an evaluation value in the platform system 100.

Note that the data structure of the evaluation value conversion information 352 depicted in FIG. 20 is merely an example, and is not the sole example.

FIG. 21 is a sequence diagram depicting the flow of a registration process in the computer system in the second embodiment.

The sequence diagram depicted in FIG. 21 depicts the flow of a process that is executed in a case where information about data, a user, a provider and the like is registered in the platform system 100, or these pieces of information are updated.

The platform system 100 receives, from a coordination system 120, a registration request including registration data (Step S101). Note that the registration request may be transmitted from a terminal 160 or the like.

Next, the information managing section 310 of the platform system 100 registers conversion information in the identifier conversion information 351 (Step S701). Specifically, processes like the ones mentioned below are executed.

The information managing section 310 gives an identifier to the registration data. The information managing section 310 adds an entry to the identifier conversion information 351.

The information managing section 310 sets the management identifier 1901 of the added entry to the identifier given to the registration data, sets the system identifier 1902 to an identifier of the coordination system 120, and sets the external identifier 1903 to an identifier originally included in the registration data.

The process at Step S701 has been explained thus far.

The processes at Step S102 and Step S103 are identical to those in the first embodiment.

The platform system 100 receives, from the coordination system 120, an update request including update data (Step S111). Note that the update request may be transmitted from a terminal 160 or the like.

At this time, the platform system 100 refers to the identifier conversion information 351, and converts an identifier included in the update data to an identifier of the management data managed by the platform system 100.

The processes at Step S112 and Step S113 are identical to those in the first embodiment.

Figure 22:
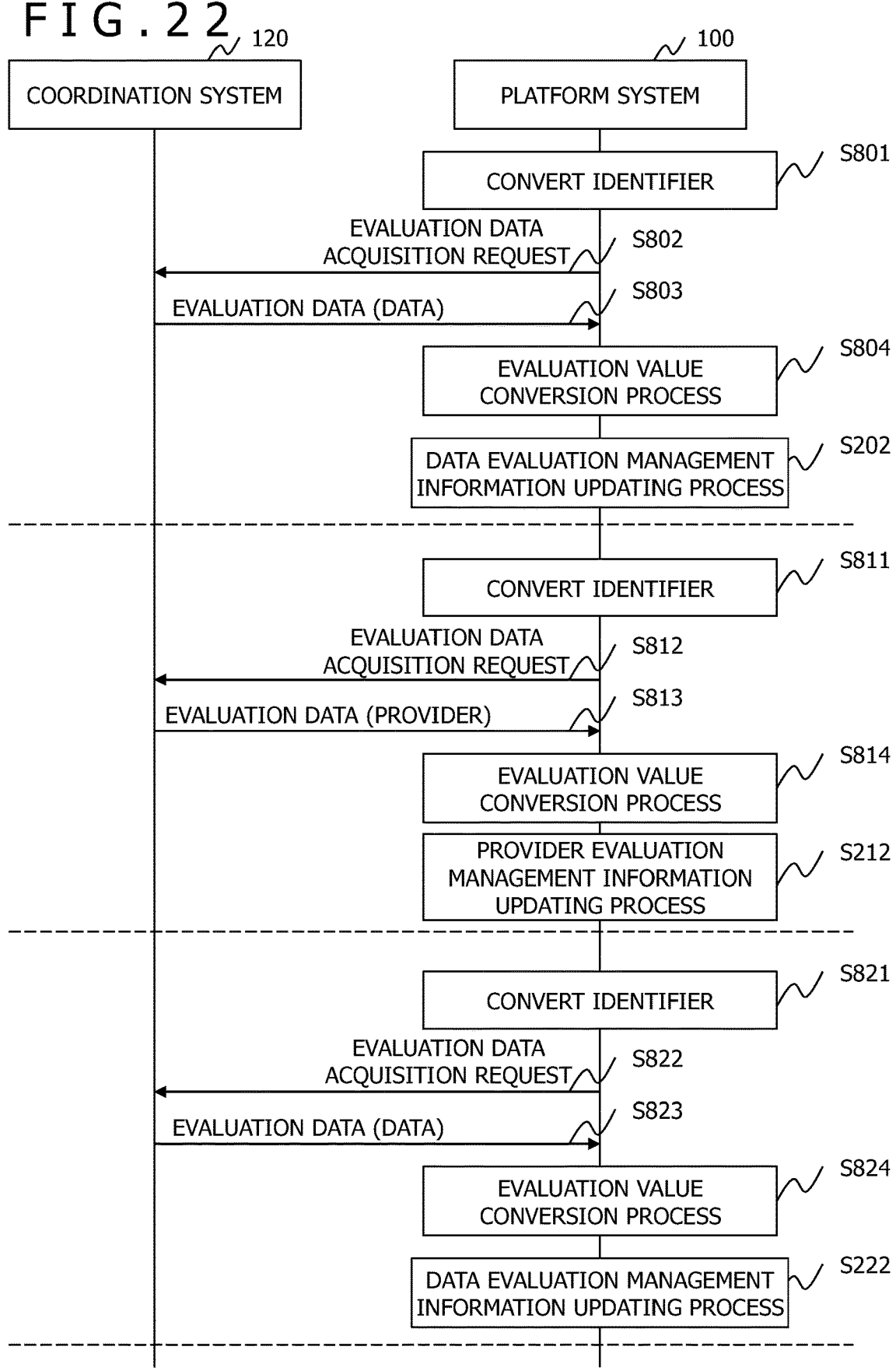
FIG. 22 is a sequence diagram depicting the flow of a process of registering evaluation data in the computer system in the second embodiment.

FIG. 22 is a sequence diagram depicting the flow of a process of registering evaluation data in the computer system in the second embodiment.

The sequence diagram depicted FIG. 22 depicts the flow of a process that is executed in a case where information about evaluation of data, users, and providers is registered in the platform system 100.

Note that, at a certain timing, a user evaluates data and a provider via a data utilization system 130 or a terminal 160, and, at a certain timing, a provider evaluates a user via a data provision system 110. Note that the user may evaluate a system itself such as a data utilization system 130 or a data provision system 110. In addition, the provider may evaluate a system itself such as a data utilization system 130, and may evaluate an organization to which the user belongs.

The evaluating section 312 of the platform system 100 selects evaluation target data, and, on the basis of the identifier conversion information 351, converts an identifier of the selected data (Step S801).

Next, the evaluating section 312 of the platform system 100 transmits, to a coordination system 120, an evaluation data acquisition request including the converted identifier of the data (Step S802).

In a case where the evaluation data acquisition request is received, the data providing section 210 of the coordination system 120 acquires evaluation data of the data from the data evaluation management information 241, and transmits the evaluation data to the platform system 100 (Step S803).

In a case where the evaluation data is received, the evaluating section 312 of the platform system 100 executes an evaluation value conversion process (Step S804). Details of the evaluation value conversion process are explained with reference to FIG. 23.

Next, the evaluating section 312 of the platform system 100 executes a process of updating the data evaluation management information 341 (Step S202). The process of updating the data evaluation management information 341 is nearly identical to that in the first embodiment. The second embodiment is different in that an identifier and a converted evaluation value of the platform system 100 are used.

The evaluating section 312 of the platform system 100 selects an evaluation target provider, and, on the basis of the identifier conversion information 351, converts an identifier of the selected provider (Step S811).

Next, the evaluating section 312 of the platform system 100 transmits, to the coordination system 120, an evaluation data acquisition request including the converted identifier of the evaluator (Step S812).

In a case where the evaluation data acquisition request is received, the data providing section 210 of the coordination system 120 acquires evaluation data of the provider from the provider evaluation management information 243, and transmits the evaluation data to the platform system 100 (Step S813).

In a case where the evaluation data is received, the evaluating section 312 of the platform system 100 executes an evaluation value conversion process (Step S814). Details of the evaluation value conversion process are explained with reference to FIG. 23.

Next, the evaluating section 312 of the platform system 100 executes a process of updating the provider evaluation management information 343 (Step S212). The process of updating the provider evaluation management information 343 is nearly identical to that in the first embodiment. The second embodiment is different in that an identifier and a converted evaluation value of the platform system 100 are used.

The evaluating section 312 of the platform system 100 selects an evaluation target user, and, on the basis of the identifier conversion information 351, converts an identifier of the selected user (Step S821).

Next, the evaluating section 312 of the platform system 100 transmits, to the coordination system 120, an evaluation data acquisition request including the converted identifier of the user (Step S822).

In a case where the evaluation data acquisition request is received, the data providing section 210 of the coordination system 120 acquires evaluation data of the user from the user evaluation management information 242, and transmits the evaluation data to the platform system 100 (Step S823).

In a case where the evaluation data is received, the evaluating section 312 of the platform system 100 executes an evaluation value conversion process (Step S824). Details of the evaluation value conversion process are explained with reference to FIG. 23.

Next, the evaluating section 312 of the platform system 100 executes a process of updating the user evaluation management information 342 (Step S222). The process of updating the user evaluation management information 342 is nearly identical to that in the first embodiment. The second embodiment is different in that an identifier and a converted evaluation value of the platform system 100 are used.

Figure 23:
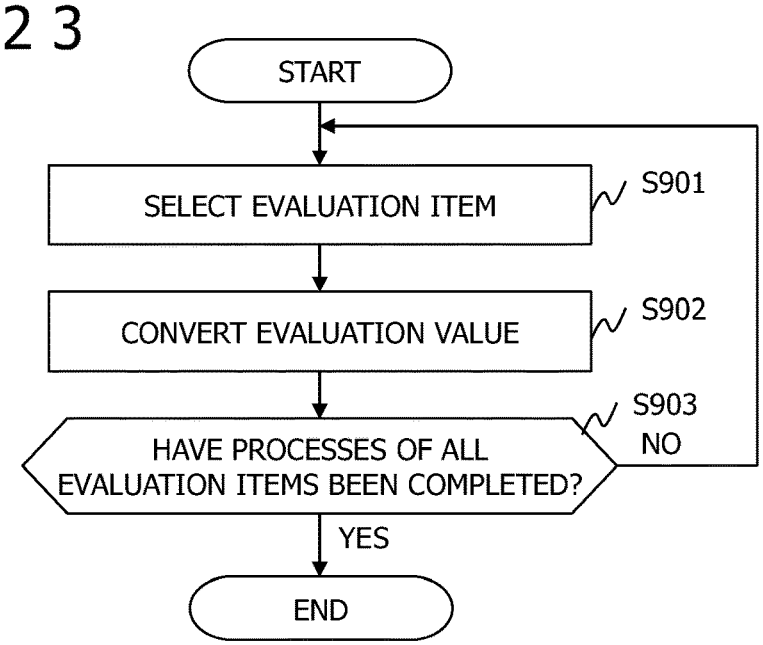
FIG. 23 is a flowchart for explaining an example of evaluation value conversion processes executed by the platform system in the second embodiment.

FIG. 23 is a flowchart for explaining an example of the evaluation value conversion processes executed by the platform system 100 in the second embodiment.

With reference to FIG. 23, the evaluation value conversion process on an evaluation value of data is explained. The evaluation value conversion processes on an evaluation value of a user and an evaluation value of a provider also are similar processes.

The evaluating section 312 selects a target evaluation item from evaluation items included in evaluation data (Step S901).

Next, the evaluating section 312 refers to the evaluation value conversion information 352, and, on the basis of a conversion method of an evaluation value corresponding to the target evaluation item, converts the evaluation value corresponding to the target evaluation item (Step S902).

Next, the evaluating section 312 decides whether or not the processes have been completed for all evaluation items included in the evaluation data (Step S903).

In a case where it is decided that the processes have not been completed for all the evaluation items included in the evaluation data, the evaluating section 312 returns to Step S901, and executes similar processes.

In a case where it is decided that the processes have been completed for all the evaluation items included in the evaluation data, the evaluating section 312 ends the process.

The search control process in the second embodiment is partially different from that in the first embodiment.

Specifically, at the processes from Step S504 to Step S506, identifiers managed by the platform system 100 are used. At the process at Step S507, the access control section 311 registers, in a data list, an identifier of data given by an operation system 101.

Figure 24:
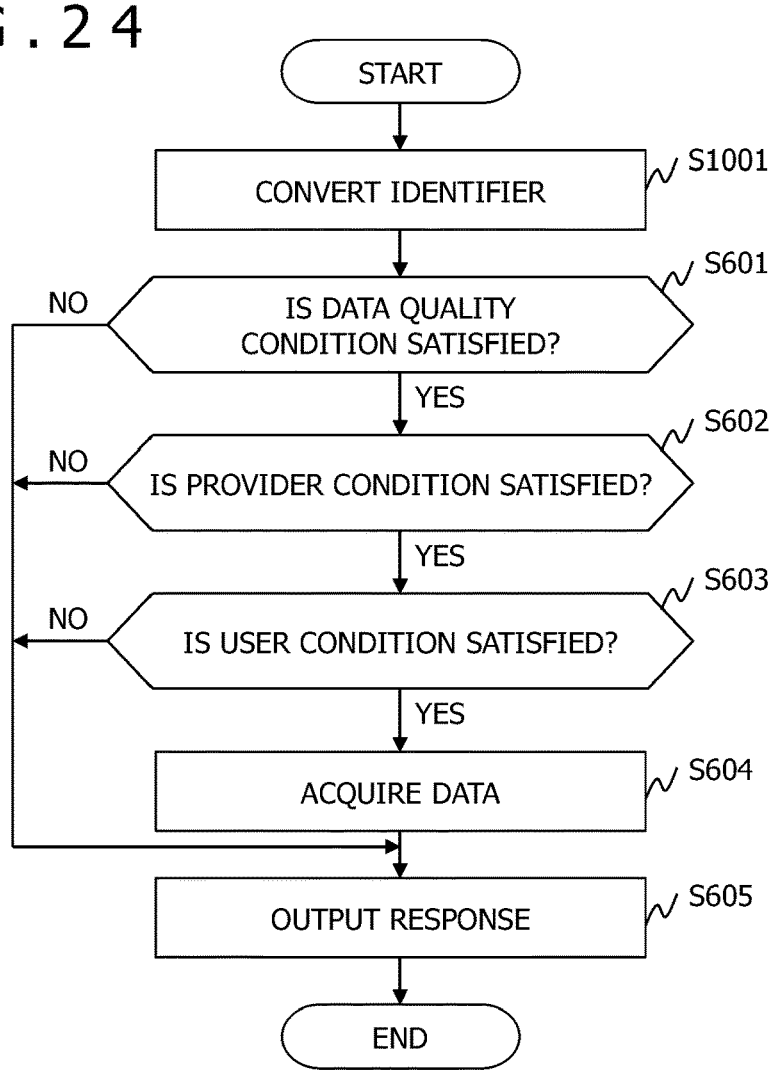
FIG. 24 is a flowchart for explaining an example of an acquisition control process executed by the platform system in the second embodiment.

The acquisition control process in the second embodiment is partially different in terms of processing from that in the first embodiment. FIG. 24 is a flowchart for explaining an example of the acquisition control process executed by the platform system 100 in the second embodiment.

On the basis of the identifier conversion information 351, the access control section 311 converts an identifier of acquisition target data (Step S1001).

The processes from Step S601 to Step S603 and the process at Step S605 are identical to those in the first embodiment. It should be noted however that the second embodiment is different in that identifiers managed by the platform system 100 are used.

At Step S604, on the basis of an identifier of data included in an acquisition request, the access control section 311 acquires the data from the data provision system 110 of an operation system 101 of a provider (Step S604).

Note that the identifier conversion function may be realized by using a system different from the platform system 100, for example, an identifier management system. In this case, the platform system 100 converts identifiers by making inquiries to the identifier management system.

Note that histories and evaluation data may be managed by a system different from the platform system 100, for example, a history management system. In this case, the management identifier 1901 of the identifier conversion information 351 stores an identifier given by the history management system. In a case where various types of request are received from an operation system 101, on the basis of the identifier conversion information 351, the platform system 100 converts identifiers, and uses the identifiers to acquire histories and evaluation data from the history management system.

According to the second embodiment, information managed by different operation systems 101 can be managed centrally. In addition, since the platform system 100 can acquire evaluation data automatically, burdens on users and providers are reduced.

Third Embodiment

A third embodiment is different in that the platform system 100 calculates evaluation values. Hereinafter, the third embodiment is explained with focus on differences from the first embodiment.

The configuration of the computer system in the third embodiment is identical to that in the first embodiment. The configurations of coordination systems 120 and the platform system 100 in the third embodiment are identical to those in the first embodiment. The registration process in the third embodiment is identical to that in the first embodiment. The access control process in the third embodiment is identical to that in the first embodiment.

The third embodiment is different in terms of the data structures of the data evaluation management information 341, the user evaluation management information 342 and the provider evaluation management information 343. Specifically, the structure 702 does not include the evaluation lists 742, 744, 746 and 748. The structure 804 does not include the evaluation lists 852, 854 and 856. In addition, the structure 903 does not include the evaluation lists 942 and 944.

The third embodiment is different in terms of a process of updating evaluation management information.

Figure 25:
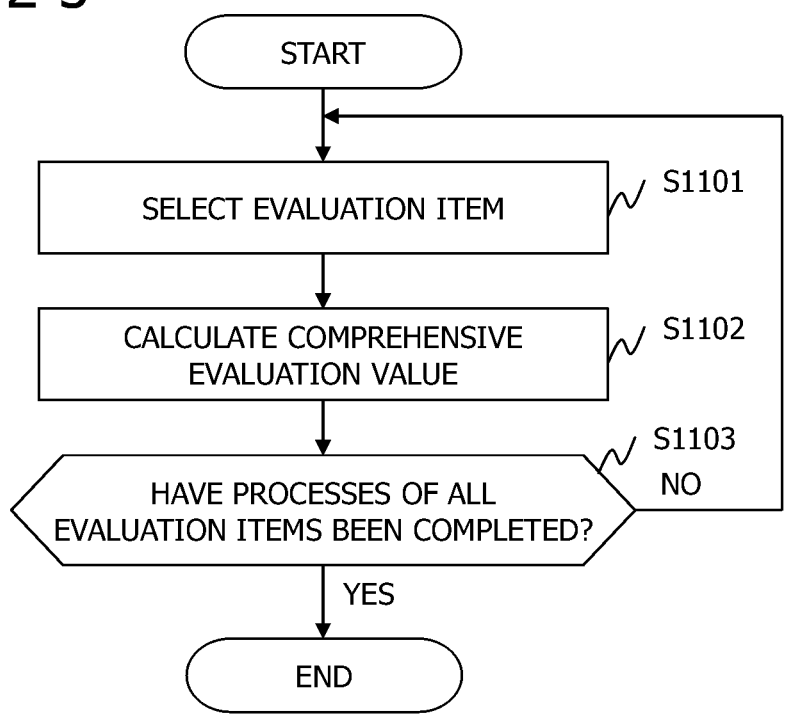
FIG. 25 is a flowchart for explaining an example of a process of updating data evaluation management information executed by the platform system in a third embodiment.

FIG. 25 is a flowchart for explaining an example of a process of updating the data evaluation management information 341 executed by the platform system 100 in the third embodiment.

The evaluating section 312 selects an evaluation item (Step S1101). It is assumed in the third embodiment that information defining an evaluation item and a method of calculating a comprehensive evaluation value is set in the platform system 100.

Next, the evaluating section 312 refers to the data management information 321 and the access history management information 331, and calculates a comprehensive evaluation value corresponding to the evaluation item (Step S1102). At this time, the evaluating section 312 sets, in a field corresponding to the evaluation item, the calculated comprehensive evaluation value.

Next, the evaluating section 312 decides whether or not the processes have been completed for all evaluation items (Step S1103).

In a case where it is decided that the processes have not been completed for all the evaluation items, the evaluating section 312 returns to Step S1101, and executes similar processes.

In a case where it is decided that the processes have been completed for all the evaluation items, the evaluating section 312 ends the process.

A process of updating the user evaluation management information 342 and a process of updating the provider evaluation management information 343 also are processes similar to the process depicted in FIG. 25.

Note that, in one mode, the platform system 100 may retain evaluation data received from operation systems 101, and evaluation data generated in the platform system 100.

Note that the second embodiment and the third embodiment may be combined. In this case, the platform system 100 automatically acquires access histories and the like, and calculates comprehensive evaluation values.

Since, according to the third embodiment, the platform system 100 can generate evaluation data automatically, burdens on users and providers are reduced.

Note that the present invention is not limited to the embodiments described above, and includes various modification examples. In addition, for example, configurations of the embodiments described above are explained in detail in order to explain the present invention in an easy-to-understand manner, and the present invention is not necessarily limited to embodiments including all the configurations explained. In addition, some of the configurations of each embodiment can be subjected to addition to another configuration, deletion or replacement.

In addition, each configuration, function, processing section, processing means or the like described above may be partially or entirely realized by hardware by, for example, designing it in an integrated circuit, and so on. In addition, the present invention can also be realized by a software program code that realizes functions of the embodiments. In this case, a storage medium having the program code recorded thereon is provided to a computer, and a processor included in the computer reads out the program code stored on the storage medium. In this case, this results in the program code itself read out from the storage medium realizing the functions of the embodiments mentioned before, and the program code itself and the storage medium storing the program code are included in the present invention. Examples of such a storage medium used to supply the program code include, for example, a flexible disk, a CD-ROM, a DVD-ROM, a hard disk, an SSD (Solid State Drive), an optical disk, a magneto-optical disk, a CD-R, a magnetic tape, a non-volatile memory card, a ROM and the like.

In addition, the program code that realizes functions described in the present embodiments can be implemented by a wide range of program or script languages such as, for example, assemblers, C/C++, perl, Shell, PHP, Python or Java (registered trademark).

Furthermore, by distributing the software program code that realizes the functions of the embodiments via a network, the program code may be stored on storage means such as a hard disk or a memory of a computer or a storage medium such as a CD-RW or a CD-R, and a processor included in the computer may read out the program code stored on the storage means or the storage medium, and execute the program code.

Control lines and information lines that are considered to be necessary for explanation are depicted in the embodiments mentioned above, and all control lines and information lines that are necessary for products are not necessarily depicted. All configurations may be connected mutually.

The invention claimed is:

1. A computer system comprising:
a plurality of provision systems that provide data, and
a platform system that controls access to the data;
wherein the platform system:
receives, from a first user, an acquisition request including a data acquisition condition for specifying data to be acquired, a quality condition related to quality of data, and a provider condition related to providers of data provided by the plurality of provision systems,
performs control such that the first user is allowed to access data satisfying the data acquisition condition in a case where the data satisfying the data acquisition condition satisfies the quality condition, and a provider of the data satisfying the data acquisition condition satisfies the provider condition,
manages user management information storing first management data for managing a characteristic of a user and controlling data access, data management information storing second management data for managing a characteristic of data provided by each of the plurality of provision systems, and provider management information storing third management data for managing a characteristic of a provider of each of the plurality of provision systems,
decides whether or not the quality condition is satisfied, on a basis of the second management data that is acquired from the data management information and is related to data satisfying the data acquisition condition, and
decides whether or not the provider condition is satisfied, based on the third management data that is acquired from the provider management information and is related to the provider who provides the data satisfying the data acquisition condition.

2. The computer system according to claim 1, wherein:
data provided by each of the plurality of provision systems is managed in association with a first user condition representing a condition of a user who is to be allowed to acquire the data,
the acquisition request includes user search information for specifying the first management data of the first user, and
the platform system further:
acquires the first management data of the first user from the user management information based on of the user search information,
decides, for each piece of data satisfying the data acquisition condition, whether or not the first user condition corresponding to the piece of the data satisfying the data acquisition condition is satisfied, based on of the first management data of the first user, and
performs control such that the first user is allowed to access the data satisfying the data acquisition condition in a case where the first user satisfies the first user condition.

3. The computer system according to claim 1, wherein:
data provided by each of the plurality of provision systems is managed in association with a second user condition representing a condition of a user who is to be allowed to search for the data, and the platform system further, in a case of receiving, from the first user, a search request including a data search condition for searching for data and user search information for specifying the first management data of the first user, searches the data provided by the plurality of provision systems for data satisfying the data search condition, acquires the first management data of the first user from the user management information on a basis of the user search information, decides, for each piece of data found through the search, whether or not the second user condition corresponding to the piece of the data found through the search is satisfied, on a basis of the first management data of the first user, and presents, to the first user, the data acquisition condition of data that is found through the search and whose corresponding second user condition is satisfied.

4. The computer system according to claim 1, wherein the second management data includes an attribute of the data and an evaluation value related to quality of the data.

5. The computer system according to claim 4, wherein the first management data includes an attribute of the user and an evaluation value related to credibility of the user, and the third management data includes an attribute of the provider and an evaluation value related to credibility of the provider.

6. The computer system according to claim 1, wherein the platform system updates the data management information on a basis of a utilization record of the data.

7. The computer system according to claim 6, further comprising a history management system that manages a utilization record of data provided by each of the plurality of provision systems, wherein the platform system acquires, from the history management system, information about a utilization record of data provided by the plurality of provision systems.

8. A method for controlling access to data method, the method comprising:

receiving, from a first user, an acquisition request including a data acquisition condition for specifying data to be acquired, a quality condition related to quality of data, and a provider condition related to providers of data provided by a plurality of provision systems;

in a case where data satisfying the data acquisition condition satisfies the quality condition, and a provider of the data satisfying the data acquisition condition satisfies the provider condition, performing control such that the first user is allowed to access the data satisfying the data acquisition condition;

managing user management information by storing first management data for managing a characteristic of a user and controlling data access, data management information storing second management data for managing a characteristic of data provided by each of the plurality of provision systems, and provider management information storing third management data for managing a characteristic of a provider of each of the plurality of provision systems, deciding whether or not the quality condition is satisfied, on a basis of the second management data that is acquired from the data management information and is related to data satisfying the data acquisition condition, and deciding whether or not the provider condition is satisfied, on a basis of the third management data that is acquired from the provider management information and is related to the provider who provides the data satisfying the data acquisition condition.

9. The method according to claim 8, wherein a platform system manages user management information storing first management data for managing a characteristic of a user, data provided by each of the plurality of provision systems is managed in association with a first user condition representing a condition of a user who is to be allowed to acquire the data, the acquisition request includes user search information for specifying the first management data of the first user, and in the case where data satisfying the data acquisition condition satisfies the quality condition, and the provider of the data satisfying the data acquisition condition satisfies the provider condition, the method further:

acquires the first management data of the first user from the user management information on a basis of the user search information, decides, for each piece of data satisfying the data acquisition condition, whether or not the first user condition corresponding to the piece of the data satisfying the data acquisition condition is satisfied, based on of the first management data of the first user, and in a case where the first user satisfies the first user condition, of performing control such that the first user is allowed to access the data satisfying the data acquisition condition.

10. The method according to claim 8, wherein data provided by each of the plurality of provision systems is managed in association with a second user condition representing a condition of a user who is to be allowed to search for the data, and the method further comprises:

in a case of receiving, from the first user, a search request including a data search condition for searching for data and user search information for specifying the first management data of the first user, searching the data provided by the plurality of provision systems for data satisfying the data search condition;

acquiring the first management data of the first user from the user management information on a basis of the user search information;

deciding, for each piece of data found through the search, whether or not the second user condition corresponding to the piece of the data found through the search is satisfied, on a basis of the first management data of the first user; and presenting, to the first user, the data acquisition condition of data that is found through the search and whose corresponding second user condition is satisfied.

11. The method according to claim 8, wherein the second management data includes an attribute of the data and an evaluation value related to quality of the data.

12. The method according to claim 11, wherein the first management data includes an attribute of the user and an evaluation value related to credibility of the user, and the third management data includes an attribute of the provider and an evaluation value related to credibility of the provider.

13. The method according to claim 8, further comprising:
updating the data management information on a basis of a utilization record of the data.

14. The method according to claim 13, wherein
the plurality of systems include a history management system that manages a utilization record of data provided by each of the plurality of provision systems, and
wherein the method further comprises:
acquiring, from the history management system, information about a utilization record of data provided by the plurality of provision systems.

15. A non-transitory computer readable storage medium storing instructions, the instructions when executed by a processor of a platform system, cause the processor to execute a method comprising:
receiving, from a first user, an acquisition request including a data acquisition condition for specifying data to be acquired, a quality condition related to quality of data, and a provider condition related to providers of data provided by a plurality of provision systems;
in a case where data satisfying the data acquisition condition satisfies the quality condition, and a provider of the data satisfying the data acquisition condition satisfies the provider condition, performing control such that the first user is allowed to access the data satisfying the data acquisition condition;
managing user management information by storing first management data for managing a characteristic of a user and controlling data access, data management information storing second management data for managing a characteristic of data provided by each of the plurality of provision systems, and provider management information storing third management data for managing a characteristic of a provider of each of the plurality of provision systems,
deciding whether or not the quality condition is satisfied, on a basis of the second management data that is acquired from the data management information and is related to data satisfying the data acquisition condition, and
deciding whether or not the provider condition is satisfied, based on f the third management data that is acquired from the provider management information and is related to the provider who provides the data satisfying the data acquisition condition.

* * * * *